US012811804B2

(12) United States Patent
Wajjala

(10) Patent No.: US 12,811,804 B2
(45) Date of Patent: Nov. 24, 2026

(54) FRAGMENT SHADER FOR CREATOR SIGNATURES IN A VIRTUAL ASSET MARKETPLACE

(71) Applicant: Roblox Corporation, San Mateo, CA (US)

(72) Inventor: Phani Harish Wajjala, Foster City, CA (US)

(73) Assignee: Roblox Corporation, San Mateo, CA (US)

( * ) Notice: Subject to any disclaimer, the term of this patent is extended or adjusted under 35 U.S.C. 154(b) by 67 days.

(21) Appl. No.: 18/968,734

(22) Filed: Dec. 4, 2024

(65) Prior Publication Data

US 2026/0155993 A1 Jun. 4, 2026

(51) Int. Cl.

| | |
|---|---|
| ***G06T 19/20*** | (2011.01) |
| ***G06T 1/00*** | (2006.01) |
| ***G06T 15/00*** | (2011.01) |
| ***H04L 9/32*** | (2006.01) |

(52) U.S. Cl.

CPC .......... *H04L 9/3247* (2013.01); *G06T 15/005* (2013.01); *G06T 19/20* (2013.01); *G06T 1/0028* (2013.01); *G06T 2210/62* (2013.01); *G06T 2219/2012* (2013.01); *G06T 2219/2016* (2013.01)

(58) Field of Classification Search

CPC ................... G06T 19/20; G06T 1/0028; G06T 2219/2012

See application file for complete search history.

(56) References Cited

U.S. PATENT DOCUMENTS

2015/0248775 A1* 9/2015 Freeman ................. G06T 11/10 345/589
2022/0021921 A1* 1/2022 Osman ............... G06Q 30/0269

OTHER PUBLICATIONS

"Rasterization and Shading", Stanford University, https://www-leland.stanford.edu/class/cs148/fall23/summer23/materials/class_03_rasterization_and_shading.pdf., Jul. 4, 2020, 51 pages.

* cited by examiner

*Primary Examiner* — Matthew Salvucci
(74) *Attorney, Agent, or Firm* — IP Spring

(57) ABSTRACT

Various implementations relate to methods, systems, and computer-readable media to dynamically apply creator signatures to virtual assets within a virtual platform. According to one aspect, a computer-implemented method includes receiving a request to display a virtual asset associated with a creator, where the request is linked to an avatar in a virtual environment hosted on the platform. A creator signature, which is defined by visual properties unique to the creator, is retrieved and stored separately from the virtual asset. The method includes rendering the virtual asset by rasterizing it and applying a fragment shader to overlay the creator signature as a dynamic visual element that changes over time based on predefined parameters. The rendered virtual asset with the dynamic signature is displayed within the virtual environment, providing visual attribution to the creator while preventing unauthorized embedding of the signature in the asset data.

20 Claims, 13 Drawing Sheets

200

FRAGMENT SHADER FOR CREATOR SIGNATURES IN A VIRTUAL ASSET MARKETPLACE

TECHNICAL FIELD

Implementations relate generally to digital asset management in virtual environments, and more specifically but not exclusively, relate to methods, systems, and computer-readable media to dynamically apply and display creator signatures on virtual assets within a virtual platform.

BACKGROUND

Current approaches to addressing unauthorized copying of user-generated virtual assets in online platforms face significant limitations. As virtual environments grow increasingly popular, creators contribute unique designs, such as clothing, accessories, and other digital items, which are easily replicated by unauthorized users. Traditional techniques, such as embedding static logos or watermarks directly into assets, are insufficient in preventing copying, as these visual identifiers can be easily extracted or replaced with minimal technical expertise. This lack of robust copy protection discourages creators from investing time and effort into developing high-quality virtual assets.

Existing moderation techniques, such as manual reviews and automated similarity detection, also fall short of effectively addressing the copying problem. Automated systems often rely on comparing textures, shapes, or metadata to detect duplicate or infringing items. These techniques struggle with edge cases, such as items with minor alterations or fragmented copies that intentionally evade detection thresholds. Manual reviews are resource-intensive, time-consuming, and prone to subjective biases, making them unscalable for platforms hosting millions of assets.

Current attempts to secure virtual assets often involve embedding ownership information, such as creator identifiers, into the metadata of the asset files. While this approach enables some level of attribution, it does not address unauthorized copying or visible branding. Metadata-based approaches lack any visual indication of authenticity, making it difficult for end users to identify genuine assets. Furthermore, as metadata can be stripped or altered by malicious actors, this approach is insufficient for protecting intellectual property in high-stakes virtual marketplaces.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations described herein relate to methods, systems, and computer-readable media to dynamically apply and display creator signatures on virtual assets within a virtual platform.

According to one aspect, a computer-implemented method includes receiving a request to display a virtual asset associated with a creator, where the request is associated with an avatar in a virtual environment. The method further includes retrieving a creator signature associated with the creator, where the creator signature defines visual properties unique to the creator and is stored separately from the virtual asset. The method further includes rendering the virtual asset by rasterizing it and applying a fragment shader to dynamically overlay the creator signature onto the pixel-based representation of the virtual asset. The rendered virtual asset, including the dynamic visual element, is displayed in the virtual environment.

In some implementations, the predefined parameters for the dynamic visual element include one or more time-based effects selected from the group including: color pulsing, rotation, and brightness variation.

In some implementations, displaying the rendered visual asset includes positioning the dynamic visual element such that the dynamic visual element is visible to one or more avatars in the virtual environment, where different avatars of the one or more avatars are at respective locations within the virtual environment.

In some implementations, applying the fragment shader includes implementing a cylindrical billboarding effect to orient the dynamic visual element towards a viewer in the virtual environment.

In some implementations, the computer-implemented method further includes applying a transparency effect to the dynamic visual element, such that the dynamic visual element does not obstruct underlying visual characteristics of the virtual asset.

In some implementations, one or more properties of the dynamic visual element are modulated based on data from the virtual environment.

In some implementations, the data from the virtual environment includes one or more pieces of data selected from the group comprising: real-time lighting conditions data, a distance between a viewer and the dynamic visual element, and a time of day within the virtual environment.

In some implementations, the virtual asset is an avatar accessory for an avatar, and the computer-implemented method further includes, prior to rendering the virtual asset, verifying that a user associated with the avatar has obtained authorized access to the virtual asset within the virtual platform.

In some implementations, the computer-implemented method further includes validating that the creator signature is distinct from one or more other existing creator signatures; and storing the creator signature in association with a creator account.

In some implementations, the creator signature is a two-dimensional image; validating that the creator signature is distinct from the one or more other existing creator signatures includes performing a comparison against respective other two-dimensional images associated with other creators to verify that the creator signature is unique; and the two-dimensional image is applied as the dynamic visual element.

According to another aspect, a system includes one or more processors and memory coupled to the one or more processors storing instructions that, when executed by the one or more processors, cause the one or more processors to perform operations including receiving a request to display a virtual asset associated with a creator, where the request is associated with an avatar in a virtual environment. The operations further include retrieving a creator signature associated with the creator, where the creator signature defines visual properties unique to the creator and is stored separately from the virtual asset. The operations further include rendering the virtual asset by rasterizing it and applying a fragment shader to dynamically overlay the creator signature onto the pixel-based representation of the virtual asset. The rendered virtual asset, including the dynamic visual element, is displayed in the virtual environment.

In some implementations, the predefined parameters for the dynamic visual element include one or more time-based effects selected from the group including: color pulsing, rotation, and brightness variation.

In some implementations, displaying the rendered visual asset includes: positioning the dynamic visual element such that the dynamic visual element is visible to one or more avatars in the virtual environment, wherein different avatars of the one or more avatars are at respective locations within the virtual environment.

In some implementations, applying the fragment shader comprises implementing a cylindrical billboarding effect to orient the dynamic visual element towards a viewer in the virtual environment.

In some implementations, the instructions cause the one or more processors to perform further operations including applying a transparency effect to the dynamic visual element, such that the dynamic visual element does not obstruct underlying visual characteristics of the virtual asset.

In some implementations, one or more properties of the dynamic visual element are modulated based on data from the virtual environment.

In some implementations, the data from the virtual environment includes one or more pieces of data selected from the group including: real-time lighting conditions data, a distance between a viewer and the dynamic visual element, and a time of day within the virtual environment.

In some implementations, the virtual asset is an avatar accessory for an avatar and further includes: prior to rendering the virtual asset, verifying that a user associated with the avatar has obtained authorized access to the virtual asset within the virtual platform.

In some implementations, the instructions cause the one or more processors to perform further operations including validating that the creator signature is distinct from one or more other existing creator signatures; and storing the creator signature in association with a creator account.

According to another aspect, a non-transitory computer-readable medium with instructions stored thereon is provided that, when executed by a processor, cause the processor to perform operations. The operations include receiving a request to display a virtual asset associated with a creator, where the request is associated with an avatar in a virtual environment. The operations further include retrieving a creator signature associated with the creator, where the creator signature defines visual properties unique to the creator and is stored separately from the virtual asset. The operations further include rendering the virtual asset by rasterizing it and applying a fragment shader to dynamically overlay the creator signature onto the pixel-based representation of the virtual asset. The rendered virtual asset, including the dynamic visual element, is displayed in the virtual environment.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications, and all such modifications are within the scope of this disclosure.

DETAILED DESCRIPTION

Figure 1:
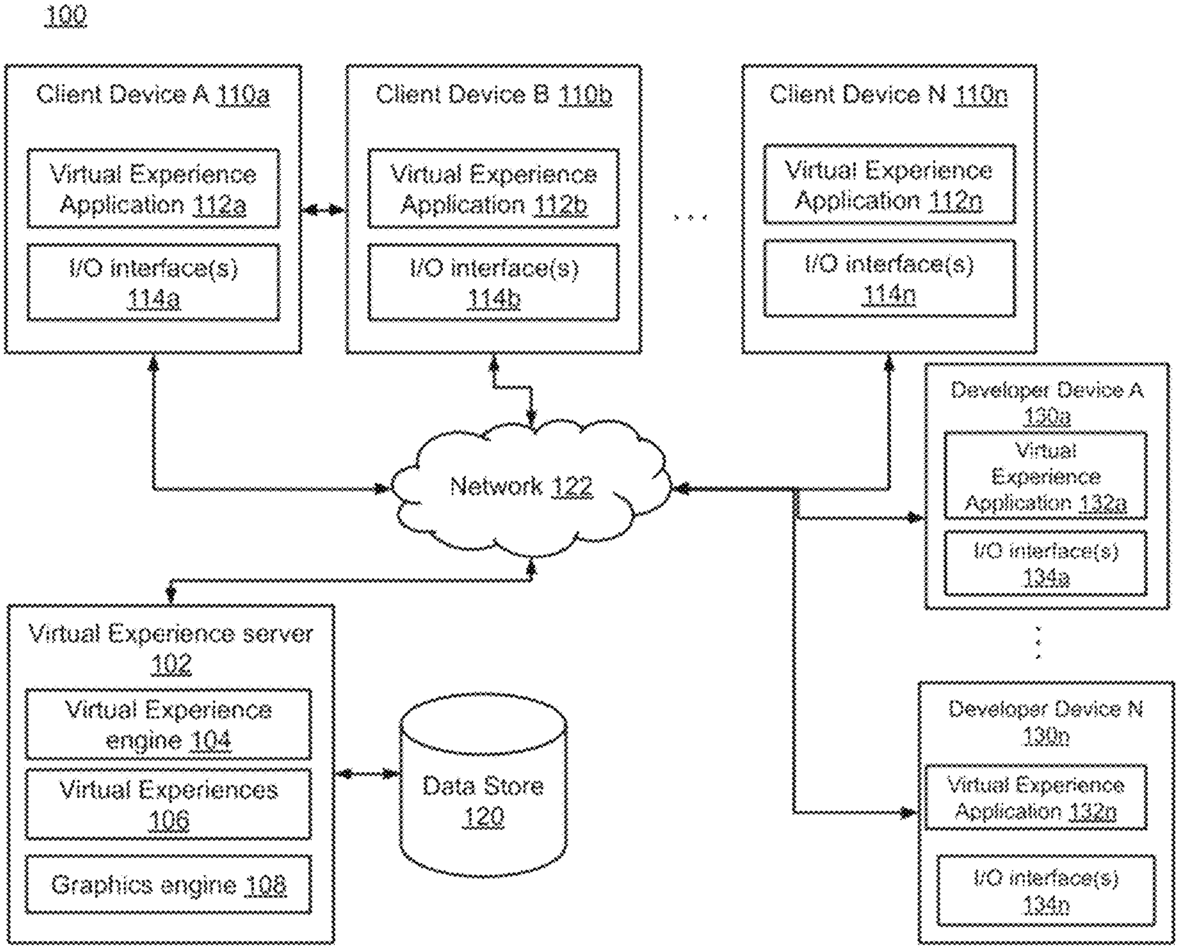
FIG. 1 is a diagram of an example system architecture, in accordance with some implementations.

In the following detailed description, reference is made to the accompanying drawings, which form a part hereof. In the drawings, similar symbols may identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

One or more implementations described herein relate to providing a fragment shader for creator signatures in a virtual asset marketplace. The described technology enables the application of dynamic creator signatures to virtual assets during rendering. The unique signatures of creators are associated with assets in a secure and non-invasive manner, reducing the risk of unauthorized duplication or modification.

In some implementations, a request is received to display a virtual asset associated with a creator. A creator signature is retrieved that defines visual properties unique to the creator, such as specific patterns, colors, or animations. This signature is stored separately from the virtual asset, enabling the core structure of the asset to remain unaffected. During rendering, the virtual asset is rasterized to generate a pixel-based representation, and a fragment shader dynamically overlays the creator signature onto this representation. The creator signature is applied as a dynamic visual element that can alter over time based on predefined parameters, such as, e.g., color pulsing, rotation, or brightness variation. The rendered virtual asset, including the dynamic creator signature, is displayed in the virtual environment.

Some technical advantages of one or more described features include the ability to dynamically overlay creator signatures onto virtual assets during rendering without altering the underlying asset data. This enables the creator signature to be visually associated with the asset during display while preventing unauthorized extraction or modification. By separating the creator signature from the core data of the virtual asset, this approach protects the intellectual property of creators and enhances the security of their branded content in virtual asset marketplaces.

Another technical advantage of some implementations is the use of fragment shaders to apply creator signatures as dynamic visual elements. The dynamic nature of the signature, such as time-based changes in color, rotation, or brightness, adds an additional layer of security by making it difficult for counterfeiters to replicate the appearance of the signature. This ensures that unauthorized copies of the virtual asset cannot duplicate the creator signature, providing robust protection against infringement.

Another technical advantage of some implementations is the modulation of the properties of the creator signature based on real-time environmental data. For example, the brightness of the creator signature can adjust to match lighting conditions, or its size and opacity can change based on the proximity of the viewer to the virtual asset. This enhances the visibility and integration of the creator signature within the virtual environment.

Another technical advantage of some implementations is the capability to validate and store distinct creator signatures in association with creator accounts. This ensures that each creator signature is unique and prevents conflicts with existing signatures.

Another technical advantage of some implementations is that the integration into the rendering pipeline ensures efficient performance. By applying the creator signature during the rendering rather than embedding it in the asset data, computational overhead is minimized and avoids introducing latency into the operations of the virtual platform.

Another technical advantage of some implementations is improved scalability of virtual asset marketplaces by enabling the managing and displaying of creator signatures. As the number of creators and virtual assets grows, the ability to store, validate, and dynamically render signatures without embedding them in asset data reduces storage and management complexity. This scalability ensures that the virtual platform can continue to support a diverse range of creators and assets while maintaining robust intellectual property protections.

System Architecture

FIG. 1 is a diagram of an example system architecture that can be used for tracking body movements of players without user-perceptible lag using a single camera feed on devices that may have limited computational processing power. FIG. 1 and the other figures use like reference numerals to identify similar elements. A letter after a reference numeral, such as "110," indicates that the text refers specifically to the element having that particular reference numeral. A reference numeral in the text without a following letter, such as "110," may include any or all of the elements in the figures bearing that reference numeral (e.g. "110" in the text may include reference numerals "110*a*," "110*b*," and/or "110*n*" in the figures).

The system architecture 100 (also referred to as "system" herein) includes online virtual experience server 102, data store 120, client devices 110*a*, 110*b*, and 110*n* (generally referred to as "client device(s) 110" herein), and developer devices 130*a* and 130*n* (generally referred to as "developer device(s) 130" herein). Virtual experience server 102, data store 120, client devices 110, and developer devices 130 are coupled via network 122. In some implementations, client device(s) 110 and developer device(s) 130 may refer to the same or same type of device.

Online virtual experience server 102 can include, among other things, a virtual experience engine 104, one or more virtual experiences 106, and graphics engine 108. In some implementations, the graphics engine 108 may be a system, application, or module that permits the online virtual experience server 102 to provide graphics and animation capability. In some implementations, the graphics engine 108 may perform one or more of the operations described below in connection with the flowchart shown in FIG. 2. In one or more additional or alternative implementations, the operations described below may be performed on one or more client devices 110, or one or more developer devices 130. In some implementations, where the operations are performed depends at least in part on computational resources, e.g., memory, processing power, or disk space. A client device 110 can include a virtual experience application 112, and input/output (I/O) interfaces 114 (e.g., input/output devices). The input/output devices can include one or more of a microphone, speakers, headphones, display device, mouse, keyboard, game controller, touchscreen, virtual reality consoles, etc.

A developer device 130 can include a virtual experience application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may include multiple storage components (e.g., multiple drives or multiple databases) that may span multiple computing devices (e.g., multiple server computers). In some implementations, data store 120 may include cloud-based storage.

In some implementations, the online virtual experience server 102 can include a server having one or more computing devices (e.g., a cloud computing system, a rackmount server, a server computer, cluster of physical servers, etc.). In some implementations, the online virtual experience server 102 may be an independent system, may include multiple servers, or be part of another system or server.

In some implementations, the online virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user with access to online virtual experience server 102. The online virtual experience server 102 may include a website (e.g., a web page) or application back-end software that may be used to provide a user with access to content provided by online virtual experience server 102. For example, users may access online virtual experience server 102 using the virtual experience application 112 on client devices 110.

In some implementations, virtual experience session data are generated via online virtual experience server 102, virtual experience application 112, and/or virtual experience application 132, and are stored in data store 120. With permission from virtual experience participants, virtual experience session data may include associated metadata, e.g., virtual experience identifier(s); device data associated with the participant(s); demographic information of the participant(s); virtual experience session identifier(s); chat transcripts; session start time, session end time, and session duration for each participant; relative locations of participant avatar(s) within a virtual experience environment; purchase(s) within the virtual experience by one or more participants(s); accessories utilized by participants; etc.

In some implementations, online virtual experience server 102 may be a type of social network providing connections between users or a type of user-generated content system that enables users (e.g., end-users or consumers) to communicate with other users on the online virtual experience server 102, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). A record of some or all user communications may be stored in data store 120 or within virtual experiences 106. The data store 120 may be utilized to store chat transcripts (text, audio, images, etc.) exchanged between participants.

In some implementations of the disclosure, a "user" may be represented as a single individual. Other implementations of the disclosure include a "user" (e.g., creating user) being an entity controlled by a set of users or an automated source. For example, a set of individual users federated as a community or group in a user-generated content system may be considered a "user."

In some implementations, online virtual experience server 102 may be or include a virtual gaming server. For example, the gaming server may provide single-player or multiplayer games to a community of users that may access a "system" herein that includes online virtual experience server 102, data store 120, and client device 110 and/or may interact with virtual experiences using client devices 110 via network 122. In some implementations, virtual experiences (including virtual realms or worlds, virtual games, other computer-simulated environments) may be 2D virtual experiences, 3D virtual experiences (e.g., 3D user-generated virtual experiences), virtual reality (VR) experiences, or augmented reality (AR) experiences, for example. In some implementations, users may participate in interactions (such as gameplay) with other users. In some implementations, a virtual experience may be experienced in near-real-time with other users of the virtual experience.

In some implementations, virtual experience engagement may refer to the interaction of one or more participants using client devices (e.g., 110) within a virtual experience (e.g., 106) or the presentation of the interaction on a display or other output device (e.g., 114) of a client device 110. For example, virtual experience engagement may include interactions with one or more participants within a virtual experience or the presentation of the interactions on a display of a client device.

In some implementations, a virtual experience 106 can include an electronic file that can be executed or loaded using software, firmware or hardware configured to present the virtual experience content (e.g., digital media item) to an entity. In some implementations, a virtual experience application 112 may be executed and a virtual experience 106 rendered in connection with a virtual experience engine 104. In some implementations, a virtual experience 106 may have a common set of rules or common goal, and the environment of a virtual experience 106 shares the common set of rules or common goal. In some implementations, different virtual experiences may have different rules or goals from one another.

In some implementations, virtual experiences may have one or more environments (also referred to as "virtual experience environments", "virtual environments", or "virtual spaces" herein) where multiple environments may be linked. An example of a virtual environment may be a three-dimensional (3D) environment. The one or more environments of a virtual experience 106 may be collectively referred to as a "world" or "virtual experience world" or "gaming world" or "virtual world" or "virtual space" or "universe" herein. An example of a world may be a 3D world of a virtual experience 106. For example, a user may build a virtual environment that is linked to another virtual environment created by another user. A character (avatar) of the virtual experience may cross the virtual border to enter the adjacent virtual environment.

It may be noted that 3D environments or 3D worlds use graphics that use a three-dimensional representation of geometric data representative of virtual experience content (or at least present virtual experience content to appear as 3D content whether or not 3D representation of geometric data is used). 2D environments or 2D worlds use graphics that use two-dimensional representation of geometric data representative of virtual experience content.

In some implementations, the online virtual experience server 102 can host one or more virtual experiences 106 and can permit users to interact with the virtual experiences 106 using a virtual experience application 112 of client devices 110. Users of the online virtual experience server 102 may play, create, interact with, or build virtual experiences 106, communicate with other users, and/or create and build objects (e.g., also referred to as "item(s)" or "virtual experience objects" or "virtual experience item(s)" herein) of virtual experiences 106.

For example, in generating user-generated virtual items, users may create characters (avatars), decoration for the characters, one or more virtual environments for an interactive virtual experience, or build structures used in a virtual experience 106, among others. In some implementations, users may buy, sell, or trade virtual experience objects, such as in-platform currency (e.g., virtual currency), with other users of the online virtual experience server 102. In some implementations, online virtual experience server 102 may transmit virtual experience content to virtual experience applications (e.g., 112). In some implementations, virtual experience content (also referred to as "content" herein) may refer to any data or software instructions (e.g., virtual experience objects, virtual experience, user information, video, images, commands, media item, etc.) associated with online virtual experience server 102 or virtual experience applications. In some implementations, virtual experience objects (e.g., also referred to as "item(s)" or "objects" or "virtual objects" or "virtual experience item(s)" herein) may refer to objects that are used, created, shared or otherwise depicted in virtual experience applications 106 of the online virtual experience server 102 or virtual experience applications 112 of the client devices 110. For example, virtual experience objects may include a part, model, character, accessories, tools, weapons, clothing, buildings, vehicles, currency, flora, fauna, components of the aforementioned (e.g., windows of a building), and so forth.

It may be noted that the online virtual experience server 102 hosting virtual experiences 106, is provided for purposes of illustration. In some implementations, online virtual experience server 102 may host one or more media items that can include communication messages from one user to one or more other users. With user permission and express user consent, the online virtual experience server 102 may analyze chat transcripts data to improve the virtual experience platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual experience 106 may be associated with a particular user or a particular group of users (e.g., a private virtual experience), or made widely available to users with access to the online virtual experience server 102 (e.g., a public virtual experience). In some implementations, where online virtual experience server 102 associates one or more virtual experiences 106 with a specific user or group of users, online virtual experience server 102 may associate the specific user(s) with a virtual experience 106 using user account information (e.g., a user account identifier such as username and password).

In some implementations, online virtual experience server 102 or client devices 110 may include a virtual experience engine 104 or virtual experience application 112. In some implementations, virtual experience engine 104 may be used for the development or execution of virtual experiences 106. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.) In some implementations, virtual experience applications 112 of client devices 110, respectively, may work independently, in collaboration with virtual experience engine 104 of online virtual experience server 102, or a combination of both.

In some implementations, both the online virtual experience server 102 and client devices 110 may execute a virtual experience engine (104 and 112, respectively). The online virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110. In some implementations, each virtual experience 106 may have a different ratio between the virtual experience engine functions that are performed on the online virtual experience server 102 and the virtual experience engine functions that are performed on the client devices 110. For example, the virtual experience engine 104 of the online virtual experience server 102 may be used to generate physics commands in cases where there is a collision between at least two virtual experience objects, while the additional virtual experience engine functionality (e.g., generate rendering commands) may be offloaded to the client device 110. In some implementations, the ratio of virtual experience engine functions performed on the online virtual experience server 102 and client device 110 may be changed (e.g., dynamically) based on virtual experience engagement conditions. For example, if the number of users engaging in a particular virtual experience 106 meets a threshold number, the online virtual experience server 102 may perform one or more virtual experience engine functions that were performed by the client devices 110.

For example, users may be playing a virtual experience 106 on client devices 110, and may send control instructions (e.g., user inputs, such as right, left, up, down, user election, or character position and velocity information, etc.) to the online virtual experience server 102. Subsequent to receiving control instructions from the client devices 110, the online virtual experience server 102 may send experience instructions (e.g., position and velocity information of the characters participating in the group experience or commands, such as rendering commands, collision commands, etc.) to the client devices 110 based on control instructions. For example, the online virtual experience server 102 may perform one or more logical operations (e.g., using virtual experience engine 104) on the control instructions to generate experience instruction(s) for the client devices 110. In other instances, online virtual experience server 102 may pass one or more or the control instructions from one client device 110 to other client devices (e.g., from client device 110*a* to client device 110*b*) participating in the virtual experience 106. The client devices 110 may use the experience instructions and render the virtual experience for presentation on the displays of client devices 110.

In some implementations, the control instructions may refer to instructions that are indicative of actions of a character (i.e., avatar) of the user within the virtual experience. For example, control instructions may include user input to control action within the experience, such as right, left, up, down, user selection, gyroscope position and orientation data, force sensor data, etc. The control instructions may include character position and velocity information. In some implementations, the control instructions are sent directly to the online virtual experience server 102. In other implementations, the control instructions may be sent from a client device 110 to another client device (e.g., from client device 110*b* to client device 110*n*), where the other client device generates experience instructions using the local virtual experience engine 104. The control instructions may include instructions to play a voice communication message or other sounds from another user on an audio device (e.g., speakers, headphones, etc.), for example voice communications or other sounds generated using the audio spatialization techniques as described herein.

In some implementations, experience instructions may refer to instructions that enable a client device 110 to render a virtual experience, such as a multiparticipant virtual experience. The experience instructions may include one or more of user input (e.g., control instructions), character position and velocity information, or commands (e.g., physics commands, rendering commands, collision commands, etc.).

In some implementations, virtual experience engine 104 or virtual experience application 112 may perform various techniques of copy detection described herein. For example, virtual experience engine 104 may generate 3D meshes of user-generated outfits equipped by avatars within the virtual platform. The virtual experience engine 104 may replace the avatar of the user with a standardized virtual mannequin and equip the user-generated outfit onto the mannequin. Virtual experience application 112 may compute sub-meshes for each body part of the virtual mannequin and generate corresponding HoG embeddings. The embeddings may be hashed using a hash function and compared to reference embeddings stored in a nearest-neighbor index, with the results used to identify potential copies of rare or high-value virtual assets.

In some implementations, characters (or virtual experience objects generally) are constructed from components, one or more of which may be selected by the user, that automatically join together to aid the user in editing.

In some implementations, a character is implemented as a 3D model and includes a surface representation used to draw the character (also known as a skin or mesh) and a hierarchical set of interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/type of body parts; proportion (e.g., shoulder and hip ratio); head size; etc.

One or more characters (also referred to as an "avatar" or "model" herein) may be associated with a user where the user may control the character to facilitate an interaction of the user with the virtual experience 106.

In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, for some asset types, e.g., shirts, pants, etc. the online virtual experience platform may provide users access to simplified 3D virtual object models that are represented by a mesh of a low polygon count, e.g., between about 20 and about 30 polygons.

In some implementations, the user may control the scale (e.g., height, width, or depth) of a character or the scale of components of a character. In some implementations, the user may control the proportions of a character (e.g., blocky, anatomical, etc.). In some implementations, a character may not include a character virtual experience object (e.g., body parts, etc.) but the user may control the character (without the character virtual experience object) to facilitate the interaction of the user with the virtual experience (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a character of a user for view or use by other users of the online virtual experience server 102. In some implementations, creating, modifying, or customizing characters, other virtual experience objects, virtual experiences 106, or virtual experience environments may be performed by a user using an I/O interface (e.g., developer interface) and with or without scripting (or with or without an application programming interface (API)). It may be noted that for purposes of illustration, characters are described as having a humanoid form. It may further be noted that characters may have any form such as a vehicle, animal, animate or inanimate object, or other creative form.

In some implementations, the online virtual experience server 102 may store characters created by users in the data store 120. In some implementations, the online virtual experience server 102 maintains a character catalog and virtual experience catalog that may be presented to users. In some implementations, the virtual experience catalog includes images of virtual experiences stored on the online virtual experience server 102. In addition, a user may select a character (e.g., a character created by the user or other user) from the character catalog to participate in the chosen virtual experience. The character catalog includes images of characters stored on the online virtual experience server 102. In some implementations, one or more of the characters in the character catalog may have been created or customized by the user. In some implementations, the chosen character may have character settings defining one or more of the components of the character.

In some implementations, a character of a user can include a configuration of components, where the configuration and appearance of components and more generally the appearance of the character may be defined by character settings. In some implementations, the character settings of a character of a user may at least in part be chosen by the user. In other implementations, a user may choose a character with default character settings or character setting chosen by other users. For example, a user may choose a default character from a character catalog that has predefined character settings, and the user may customize the default character by changing some of the character settings (e.g., adding a shirt with a customized logo). The character settings may be associated with a particular character by the online virtual experience server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may be referred to as a "user device." In some implementations, one or more client devices 110 may connect to the online virtual experience server 102 at any given moment. It may be noted that the number of client devices 110 is provided as illustration. In some implementations, any number of client devices 110 may be used.

In some implementations, each client device 110 may include an instance of the virtual experience application 112, respectively. In one implementation, the virtual experience application 112 may permit users to use and interact with online virtual experience server 102, such as control a virtual character in a virtual experience hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual experience, etc.) served by a web server. In another example, the virtual experience application may be a native application (e.g., a mobile application, app, virtual experience program, or a gaming program) that is installed and executes local to client device 110 and enables users to interact with online virtual experience server 102. The virtual experience application may render, display, or present the content (e.g., a web page, a media viewer) to a user. In an implementation, the virtual experience application may include an embedded media player (e.g., a Flash® or HTML5 player) that is embedded in a web page.

According to aspects of the disclosure, the virtual experience application may be an online virtual experience server application for users to build, create, edit, and upload content to the online virtual experience server 102 as well as interact with online virtual experience server 102 (e.g., engage in virtual experiences 106 hosted by online virtual experience server 102). As such, the virtual experience application may be provided to the client device(s) 110 by the online virtual experience server 102. In another example, the virtual experience application may be an application that is downloaded from a server.

In some implementations, each developer device 130 may include an instance of the virtual experience application 132, respectively. In one implementation, the virtual experience application 132 may permit a developer user(s) to use and interact with online virtual experience server 102, such as control a virtual character in a virtual experience hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual experience, etc.) served by a web server. In another example, the virtual experience application may be a native application (e.g., a mobile application, app, virtual experience program, or a gaming program) that is installed and executes local to client device 110 and enables users to interact with online virtual experience server 102. The virtual experience application may render, display, or present the content (e.g., a web page, a media viewer) to a user. In an implementation, the virtual experience application may include an embedded media player (e.g., a Flash® or HTML5 player) that is embedded in a web page.

According to aspects of the disclosure, the virtual experience application 132 may be an online virtual experience server application for users to build, create, edit, and upload content to the online virtual experience server 102 as well as interact with online virtual experience server 102 (e.g., provide and/or engage in virtual experiences 106 hosted by online virtual experience server 102). As such, the virtual experience application may be provided to the client device(s) 110 by the online virtual experience server 102. In another example, the virtual experience application 132 may be an application that is downloaded from a server. Virtual experience application 132 may be configured to interact with online virtual experience server 102 and obtain access to user credentials, user currency, etc. for one or more virtual experiences 106 developed, hosted, or provided by a virtual experience developer.

In some implementations, a user may login to online virtual experience server 102 via the virtual experience application. The user may access a user account by providing user account information (e.g., username and password) where the user account is associated with one or more characters available to participate in one or more virtual experiences 106 of online virtual experience server 102. In some implementations, with credentials, a virtual experience developer may obtain access to virtual experience virtual objects, such as in-platform currency (e.g., virtual currency), avatars, special powers, or accessories, which are owned by or associated with other users.

In general, functions described in one implementation as being performed by the online virtual experience server 102 can be performed by the client device(s) 110, or a server, in other implementations if appropriate. In addition, the functionality attributed to a particular component can be performed by different or multiple components operating together. The online virtual experience server 102 can be accessed as a service provided to other systems or devices through suitable application programming interfaces (hereinafter "APIs"), and thus is not limited to use in websites.

Providing Creator Signatures for Virtual Assets in a Virtual Platform

Figure 2:
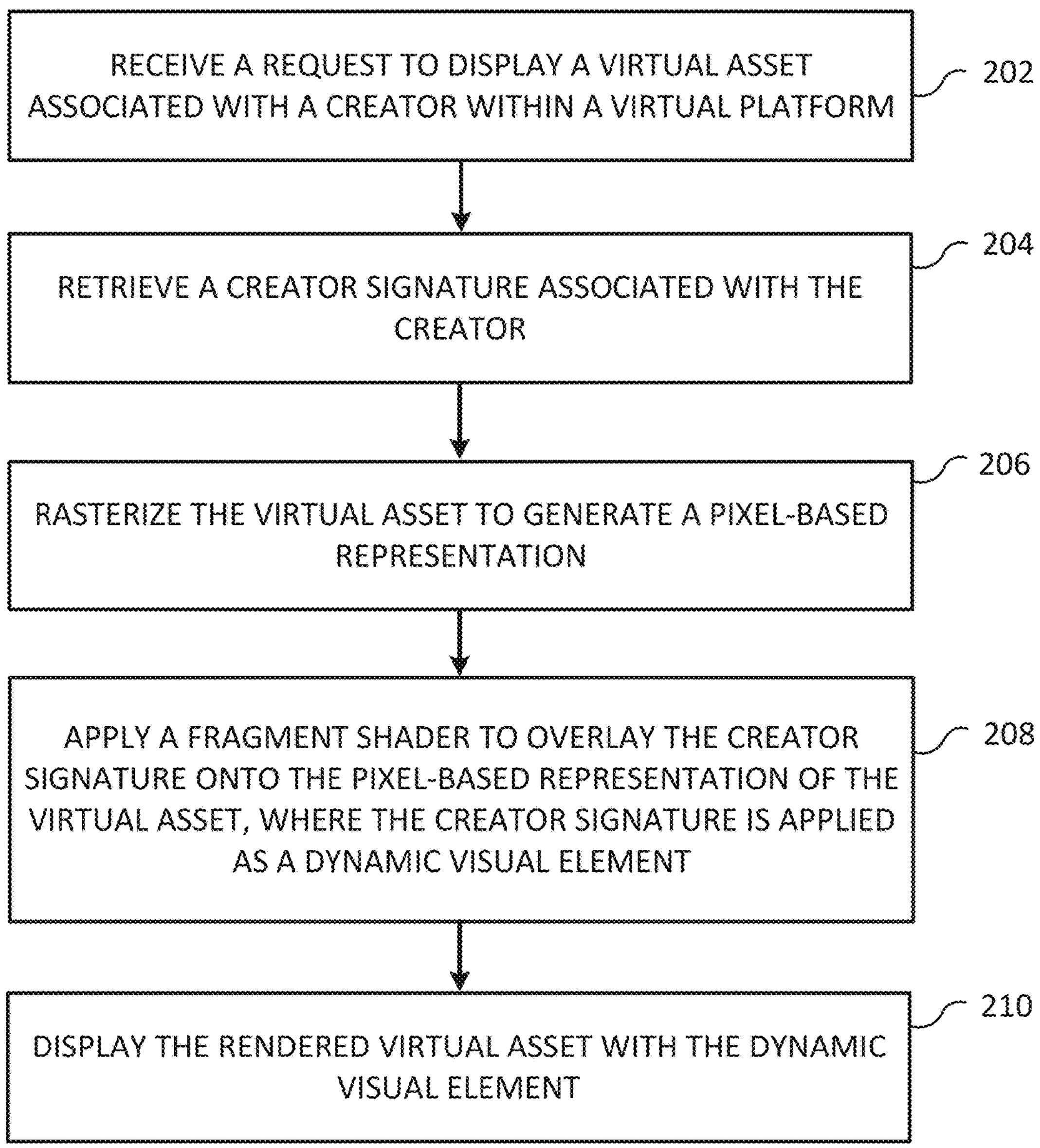
FIG. 2 is a flow diagram that illustrates an example method to provide a fragment shader for creator signatures in a virtual asset marketplace, in accordance with some implementations.

FIG. 2 is a flow diagram that illustrates an example method 200 to apply and display creator signatures on virtual assets within a virtual platform, in accordance with some implementations. In various implementations, the blocks shown in FIG. 2 and described below may be performed by any of the elements illustrated in FIG. 1, e.g., one or more of client devices 110 and/or online virtual experience server 102. For example, in a distributed simulation, two or more client devices 110 may perform method 200, or at least one client device 110 and online virtual experience server 102 may perform method 200. In some implementations, some blocks of method 200 may be performed by a client device 110 and other blocks of method 200 may be performed by an online virtual experience server 102. Method 200 begins at block 202.

At block 202, a request is received to display a virtual asset associated with a creator within a virtual platform, where the request is associated with an avatar in a virtual experience hosted on the virtual platform. A virtual asset includes a digital item, such as a clothing article, accessory, or object, that can be associated with an avatar within a virtual environment. Virtual assets may be created by users of the platform, referred to as creators, and can be purchased, traded, or acquired through transactions within the platform. In some implementations, virtual assets are stored in platform-managed repositories, and their display is initiated through requests originating from user interactions within the platform.

In some implementations, the request to display a virtual asset is associated with an avatar, which includes a visual representation of a user within the virtual platform. Avatars may take the form of 2D or 3D models and are customized by users through the application of various virtual assets. For example, an avatar may include a user-generated outfit consisting of a shirt, pants, and accessories, each represented as distinct virtual assets. A user-generated outfit includes a combination of virtual assets selected and applied by a user to their avatar within the virtual environment.

When a user enters a virtual experience, the virtual platform identifies the assets associated with the avatar of the user and issues a request to render these assets for display within the experience. The request may include metadata specifying the type of virtual asset, its location relative to the avatar model, and other rendering parameters. For example, in a gaming environment, the platform may request the display of a virtual helmet as part of the outfit of the avatar.

In some implementations, the creator signature is validated to be distinct from one or more other existing creator signatures, and the creator signature is stored in association with a creator account. It is validated that each creator signature within the virtual platform is unique and does not conflict with signatures associated with other creators. In some implementations, the validation includes comparing the creator signature against a database of existing signatures. This comparison can be performed using image processing techniques or other similarity detection algorithms. For example, if the creator signature is represented as a two-dimensional image, feature vectors or hash values may be computed for the image and compared against stored vectors or hashes for other signatures. If the computed similarity meets a predefined threshold, the signature can be flagged as non-distinct and require the creator to submit a revised version.

Once the creator signature is validated as distinct, it is stored in association with the account of the creator. The creator account serves as a digital record that links the contributions of the creator to their identity within the virtual platform. The stored signature may include metadata, such as the date of creation, a unique identifier of the creator, and additional properties defining the visual and dynamic characteristics of the signature. This information may be maintained in a repository or database managed by the virtual platform.

In some implementations, the creator signature is represented as a two-dimensional (2D) image, and the validation includes comparing the 2D image against other 2D images associated with other creators to verify its uniqueness. A 2D image in this context includes a flat, rasterized or vectorized representation including visual properties such as patterns, colors, or logos that identify the creator. The validation step is performed to verify that the 2D image does not visually overlap or conflict with existing creator signatures stored in the virtual platform.

In various implementations, the comparison uses one or more techniques such as, e.g., feature extraction, hashing, and direct pixel-by-pixel analysis to evaluate the distinctiveness of the submitted 2D image. For example, a feature vector may be generated for the submitted signature using algorithms like Histogram of Oriented Gradients (HoG) or Scale-Invariant Feature Transform (SIFT) and compared against a database of feature vectors for existing signatures. If the similarity score between the submitted image and any stored image exceeds a predefined threshold, the signature is flagged as non-unique, prompting further revision by the creator.

In some implementations, once the submitted 2D image is validated as unique, it is designated as a dynamic visual element to be applied during a rendering process, as will be described in further detail below with respect to blocks 206 and 208. In some implementations, the validated 2D image is stored in association with the creator account, including metadata such as properties, a creation date, and a unique identifier of the signature. This stored image is retrieved when a virtual asset associated with the creator is rendered, ensuring that the correct dynamic visual element is used to represent the signature of the creator. Block 202 may be followed by block 204.

At block 204, a creator signature associated with the creator is retrieved. A creator signature includes a unique visual identifier associated with a creator within a virtual platform. It may include visual properties such as logos, patterns, and/or other design elements that are specific to the creator and distinguish their contributions within the platform. The creator signature is stored separately from the virtual asset, enabling it to be associated with multiple assets or updated independently. For example, if a creator produces multiple virtual assets, such as accessories or clothing for avatars, a single creator signature may be applied to each of these assets during rendering.

The creator signature is defined by a set of visual properties that govern its appearance and behavior. Visual properties may include attributes such as color schemes, geometric patterns, and/or animation effects that are associated with the branding or identity of the creator. For example, a creator signature may specify a logo with a pulsing color effect or a rotating pattern that changes based on the perspective of the viewer. These visual properties may be predefined by the creator or be generated automatically based on rules specified during the signature creation process.

The creator signature is stored in a separate repository or database managed by the virtual platform. Storing the creator signature independently from the virtual asset enables maintaining a distinct association between the creator and the asset without modifying the core data of the asset. For example, a virtual asset such as a user-generated outfit may consist of a jacket and matching pants. The repository links the creator signature to these items without embedding the signature directly within the asset data files. The separation enables changes to the signature without requiring modifications to the associated assets.

The retrieval of the creator signature includes identifying the creator associated with the virtual asset and querying the repository to access the corresponding signature. Metadata associated with the virtual asset is used to locate the creator and retrieve the correct signature. For example, if a request is received to display a hat within a virtual environment, the metadata of the hat may include an identifier for the creator. This identifier is used to query the database and retrieve the creator signature. Block 204 may be followed by block 206.

At block 206, the virtual asset is rendered for display in the virtual environment by rasterizing the virtual asset to generate a pixel-based representation. Rendering includes converting a virtual asset, defined as a digital object such as a clothing item, accessory, or other visual element, into a displayable format suitable for visualization within a virtual platform. Rasterization transforms the geometric and visual properties of the virtual asset into a pixel-based format, which is the representation used by display devices.

Rasterization includes interpreting the virtual asset as a collection of geometric shapes, often represented as meshes composed of vertices and edges. These meshes are defined in three-dimensional space and include texture data and material properties that dictate the appearance of the asset. For example, a virtual asset representing a user-generated outfit might include a jacket with fabric textures, defined lighting effects, and material-specific reflectivity. During rasterization, these properties are processed to generate corresponding pixels, which are mapped to the display surface.

During rasterization, the vertices of the virtual asset are transformed from their three-dimensional coordinates into a two-dimensional representation that aligns with the perspective of the viewer. This transformation accounts for factors such as the position of the viewer, the orientation of the asset, and any camera effects within the virtual environment. The areas enclosed by these transformed shapes are filled with pixels, using the texture and material data of the asset to determine the color and shading of each pixel. For example, if the asset includes a metallic material, rasterization will apply reflections and highlights to simulate the appearance of metal.

The pixel-based representation generated during rasterization is stored temporarily in memory for subsequent processing steps. This representation serves as the foundation for additional visual enhancements, such as the overlay of the creator signature or the application of dynamic lighting effects. The completed pixel-based representation is sent to the rendering pipeline for display within the virtual environment. For example, in a social gaming platform, the rendered image of an avatar wearing a user-generated outfit is integrated into the scene to be viewed by other users.

In some implementations, the virtual asset is an avatar accessory associated with an avatar, and prior to rendering the virtual asset, it is verified that a user associated with the avatar has obtained authorized access to the virtual asset within the virtual platform. An avatar accessory is a specific type of virtual asset designed to customize or enhance the appearance of an avatar. Examples of avatar accessories include items such as, e.g., hats, glasses, backpacks, or other decorative elements that are visually attached to the avatar within the virtual environment.

In some implementations, the verification includes determining whether the user associated with the avatar has validly acquired the virtual asset through a transaction or other authorized means. This may include, e.g., verifying a purchase, trade, or inclusion of the asset in the account of the user as part of a predefined allocation. The verification step uses metadata or records stored within a database of the virtual platform to confirm the ownership or licensing status of the virtual asset. For example, if the virtual asset is a hat, an account of the user is checked for whether it includes a record of the purchase or acquisition of the hat.

In some implementations, the verification is performed prior to initiating the rendering to prevent unauthorized display or use of virtual assets. The verification may involve querying a central database that maintains transaction records and asset ownership details. For example, the platform can validate a digital receipt associated with the account of the user or check for an authorization token linked to the virtual asset.

Once the verification is complete and authorized access is confirmed, rendering is performed. The avatar accessory is incorporated into the appearance of the avatar and prepared for display within the virtual environment. If it is determined at the verification step that the user does not have authorized access to the asset, the rendering may be prevented, or the asset may be substituted with an alternative placeholder or error indication. Block 206 is followed by block 208.

At block 208, the virtual asset is continued to be rendered for display in the virtual environment by applying a fragment shader to overlay the creator signature onto the pixel-based representation of the virtual asset. A fragment shader is a programmable component of the rendering pipeline that processes individual pixels of the rasterized representation of the virtual asset to apply additional visual effects. In this context, the fragment shader is used to dynamically incorporate the creator signature as a visual overlay on the virtual asset.

The creator signature is applied as a dynamic visual element, which is a visual feature that changes appearance based on predefined parameters. These parameters may include properties such as time-based effects, environmental factors, or viewer perspective. The dynamic nature of the signature enhances its visibility and integrates it with the virtual asset while maintaining its association with the creator.

The fragment shader operates by accessing the pixel-based representation of the virtual asset generated during rasterization and blending the creator signature into the relevant regions of the asset. The shader uses the visual properties of the creator signature, retrieved at a prior step, to determine how the signature interacts with the underlying asset. For example, the shader may apply a semi-transparent overlay of the creator signature that enables the original texture of the asset to remain visible beneath the signature.

During rendering, the fragment shader modulates the properties of the creator signature based on predefined parameters and contextual data. For example, if the virtual environment includes dynamic lighting, the shader may adjust the brightness of the creator signature to ensure consistent visibility.

In various implementations, the predefined parameters for the dynamic visual element include time-based effects that alter the appearance of the creator signature over time. These effects are implemented to introduce variations in the visual presentation of the creator signature, making it a dynamic component of the rendered virtual asset. The predefined parameters may specify attributes such as, e.g., color pulsing, rotation, or brightness variation, each of which is controlled by temporal values calculated during rendering.

In some implementations, color pulsing is utilized as an effect where the color of the creator signature transitions smoothly between predefined shades or intensities over a time interval. This effect can be implemented, e.g., by using sinusoidal or linear interpolation functions that adjust the color values in real-time based on the current timestamp. For example, the creator signature may gradually transition from a light blue hue to a darker blue hue in a repeating cycle. These calculations are applied within the fragment shader, modifying the color attributes of each pixel associated with the signature to create a continuous and smooth color change.

In some implementations, rotation is utilized as an effect involving altering the orientation of the creator signature over time, creating the appearance that the signature is spinning or rotating within the rendered scene. This effect may be achieved by applying a rotational transformation to the coordinates of the signature during rendering. For example, a creator signature represented as a 2D logo can be mapped onto a plane, and its texture coordinates can be rotated by a specified angle based on the elapsed time. The rotation angle is calculated using a time-dependent formula, such as multiplying the elapsed time by a constant angular velocity, ensuring a consistent rotational effect.

In some implementations, brightness variation may be utilized as a time-based effect where the intensity of the luminance of the creator signature is modulated over a defined time cycle. This effect is applied by scaling the brightness of the color values of the signature, using a periodic function such as a sine wave to adjust the luminance between a minimum and maximum value. For example, the signature may appear brighter during one phase of the cycle and dimmer during another, creating a pulsating glow effect. These variations are calculated in the fragment shader and applied to the pixels of the signature during rendering, enabling the visual characteristics of the creator signature to dynamically adapt in real-time based on temporal parameters.

In some implementations, applying the fragment shader includes implementing a cylindrical billboarding effect to orient the dynamic visual element toward a viewer in the virtual environment. Cylindrical billboarding is a technique in computer graphics that aligns a visual element, such as the dynamic visual element, to face the viewpoint of a viewer while maintaining a fixed orientation along one axis. This technique is used to ensure that the dynamic visual element remains visible and legible regardless of the position of the viewer relative to the virtual asset.

In some implementations, the cylindrical billboarding effect operates by aligning the plane of the dynamic visual element with the viewing direction of the user in the virtual environment. The effect restricts rotation to a single axis, e.g., a vertical axis in a three-dimensional space. For example, if the viewer is positioned at an angle to the virtual asset, the dynamic visual element will rotate around the vertical axis of the asset to maintain its orientation toward the viewer while avoiding tilting along the other axes.

In some implementations, the alignment is achieved through mathematical transformations that calculate the viewing direction relative to the position of the virtual asset. The rendering determines the vector from the viewer to the asset and computes the necessary rotation to align the dynamic visual element with this vector. For example, if the asset is a hat displayed on an avatar and the dynamic visual element is a creator signature, the cylindrical billboarding effect will adjust the rotation of the signature so that it faces the viewer as the viewer causes the avatar to move around.

In some implementations, a transparency effect is applied to the dynamic visual element to prevent it from obstructing the underlying visual characteristics of the virtual asset. A transparency effect modifies the opacity of the dynamic visual element, enabling the visual features of the asset beneath it to remain partially or fully visible. This ensures that the dynamic visual element integrates with the asset without obscuring its textures, colors, or design elements.

In some implementations, the transparency effect is implemented within the rendering pipeline by blending the pixel values of the dynamic visual element with those of the underlying virtual asset. The blending is controlled by an opacity factor, which specifies the degree of transparency. For example, an opacity factor of 0.5 would result in equal blending of the dynamic visual element and the virtual asset, while lower values would make the dynamic visual element appear more translucent.

In some implementations, in order to calculate the blended appearance, the rendering combines the color and texture data of the virtual asset with the corresponding data of the dynamic visual element. This blending uses an algorithm that weights the contribution of each layer based on the specified opacity factor. For example, if the virtual asset is a shirt with a textured fabric pattern and the dynamic visual element is a creator signature, the transparency effect enables the fabric pattern to remain visible beneath the signature while maintaining the integrity of both visual layers.

In some implementations, the transparency effect may be dynamically adjusted based on contextual parameters, such as lighting conditions or the distance between the viewer and the virtual asset. This enables the dynamic visual element to appear more or less pronounced depending on its surroundings while preserving the underlying characteristics of the asset.

In some implementations, one or more properties of the dynamic visual element are modulated based on data from the virtual environment. Modulation includes dynamically adjusting specific attributes of the dynamic visual element in response to contextual data collected during the rendering process. These properties may include visual characteristics such as, e.g., brightness, color, size, or opacity, which are modified to align with environmental conditions or user interactions within the virtual platform.

The virtual environment includes the interactive digital space where users and avatars engage with virtual assets. Data from the virtual environment may include information such as lighting conditions, spatial relationships between viewers and virtual assets, or temporal factors like the time of day in the virtual environment. For example, if the virtual environment includes a fluctuating light source, the brightness of the dynamic visual element can be modulated to maintain visibility by increasing or decreasing its luminance in real time.

Modulation is achieved by processing the environmental data as input to the rendering pipeline, where the fragment shader is utilized to calculate adjustments to the properties of the dynamic visual element. For example, if the viewer is positioned far from the virtual asset, the size of the dynamic visual element may be scaled up to improve visibility. Similarly, the opacity of the dynamic visual element can be modulated based on the proximity of the asset to other objects in the environment.

In some implementations, the adjustments are calculated using predefined algorithms or mathematical functions that map the environmental data to the desired property changes. For example, a sine function may be used to modulate color intensity based on a time variable, creating a pulsating effect that synchronizes with the temporal dynamics of the virtual environment.

In some implementations, the data from the virtual environment used to modulate the properties of the dynamic visual element comprises one or more pieces of data selected from the group including real-time lighting conditions, the distance between a viewer and the dynamic visual element, and the time of day within the virtual environment. Each type of data provides contextual information that the rendering uses to dynamically adjust the visual attributes of the dynamic visual element during rendering.

In some implementations, real-time lighting conditions may include the ambient and directional light levels present in the virtual environment at any given moment. In some implementations, this data is computed based on the position and intensity of virtual light sources within the scene. For example, if a virtual environment includes a moving light source such as a simulated sun, the rendering may modulate the brightness or color of the dynamic visual element to match the light levels.

In some implementations, the distance between a viewer and the dynamic visual element is a factor that influences modulation. This distance is measured as the spatial separation between the position of the viewer, such as the camera or a viewpoint of the avatar, and the position of the virtual asset including the dynamic visual element. For example, when the viewer is far from the virtual asset, the rendering may increase the size or contrast of the dynamic visual element to improve visibility. Conversely, as the viewer approaches the asset, the dynamic visual element may be scaled down or made more subtle to align with the closer perspective.

In some implementations, a temporal parameter is included that defines the simulated time in the virtual environment. For example, a virtual environment may represent different times of day such as morning, afternoon, or evening. This data can be used to adjust the color palette of the dynamic visual element, such as shifting its hues to cooler tones during nighttime or warmer tones during daylight. Block 208 may be followed by block 210.

At block 210, the rendered virtual asset with the dynamic visual element is displayed in the virtual environment. Displaying includes the processed visual representation of the virtual asset, including the dynamic creator signature, being presented to users within the virtual platform. The display is executed on the devices of users, such as monitors, virtual reality headsets, or augmented reality interfaces, as part of the interactive virtual environment.

For example, a user participating in a virtual experience might see their avatar wearing a user-generated outfit that includes accessories marked with the dynamic creator signature. The virtual experience integrates the rendered asset into the scene.

The dynamic visual element, which represents the creator signature, is displayed in its modulated state as determined by prior steps in the rendering process. In some implementations, this may include time-based effects such as pulsing or rotation, or environmental adjustments such as changes in brightness based on lighting conditions. For example, if the virtual experience includes a shared social space, other users interacting within the environment will perceive the rendered virtual asset and its dynamic creator signature as part of the avatar of the user.

The displayed virtual asset, including its dynamic visual element, is visible to one or more users participating in the experience and interacts with the visual context of the virtual environment. The displayed output is synchronized with other elements of the virtual experience, such as, e.g., avatars of other users, environmental objects, and interactive components.

In some implementations, displaying the rendered virtual asset includes positioning the dynamic visual element, such as the creator signature, to enable its visibility to one or more avatars in the virtual environment. Positioning includes determining the location and orientation of the dynamic visual element relative to the virtual asset and the viewing perspectives of the avatars. The position is calculated during rendering to account for spatial relationships between the virtual asset, the dynamic visual element, and the viewing avatars.

Avatars within the virtual environment are representations of users, each occupying distinct locations within the shared virtual environment. These locations may be described in terms of three-dimensional coordinates within the virtual space. For example, in a multiplayer gaming environment, different avatars may be situated at varying distances and angles relative to the virtual asset. The positioning of the dynamic visual element is computed to ensure that it remains perceptible to avatars regardless of their relative positions.

In some implementations, the computation for positioning includes geometric transformations to orient the dynamic visual element based on the perspective of the viewer. For example, the dynamic visual element can be positioned on a specific surface of the virtual asset that is most visible to the majority of avatars within the scene. Techniques such as cylindrical or spherical billboarding may be used to dynamically reorient the visual element so that it faces the viewing avatars regardless of their spatial arrangement. This includes aligning the normal vector of the dynamic visual element with the line of sight from the avatar to the asset.

In cases where multiple avatars observe the same virtual asset from different perspectives, an optimal position is calculated for the dynamic visual element to balance visibility for all viewers. For example, priority may be given to positioning the dynamic visual element on the side of the asset that is most frequently observed or most centrally located within the viewing angles of the avatars. The final rendered display incorporates the positioned dynamic visual element as part of the virtual asset.

In some implementations, one or more of blocks 202-210 may be performed by one or more server devices, and one or more of blocks 202-210 may be performed by one or more client devices. In some implementations, all of method 200 may be performed by a server device, or by a client device.

Figure 3A:
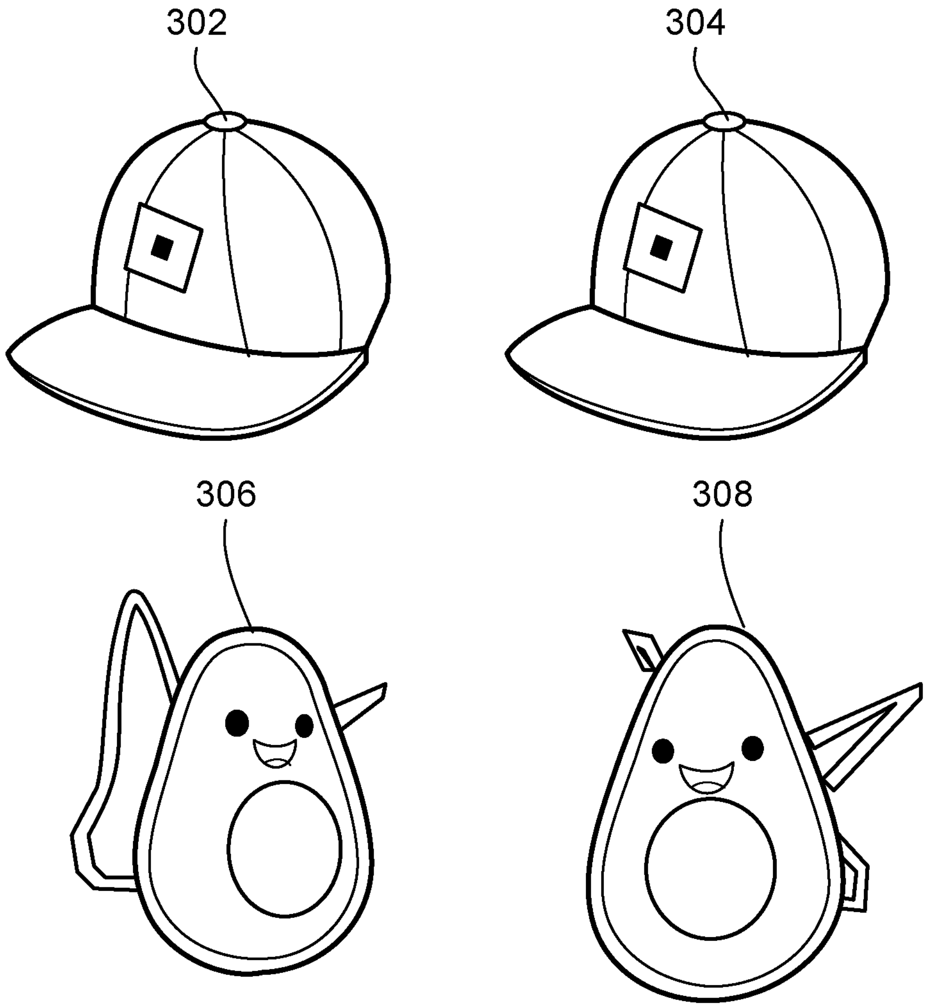
FIG. 3A is a diagram that illustrates examples of pairs of identical copies of virtual assets within a virtual platform, in accordance with some implementations.

FIG. 3A is a diagram that illustrates examples of pairs of identical copies of virtual assets within a virtual platform, in accordance with some implementations. The figure depicts two hats labeled 302 and 304, and two backpacks labeled 306 and 308. Each pair of virtual assets represents identical visual designs created within the virtual platform, highlighting the issue of indistinguishable copies in a digital environment.

The first pair of virtual assets, 302 and 304, includes hats with identical designs. These virtual hats may be designed by a creator for avatars to wear within the virtual platform. Without a distinct dynamic visual identifier, such as a creator signature, these identical assets may be difficult or impossible to distinguish from one another. The lack of visual differentiation introduces the risk of unauthorized copies being used, distributed, or sold, thereby complicating enforcement of intellectual property rights for the original creator.

The second pair of virtual assets, 306 and 308, includes backpacks designed to resemble avocados with cartoon-like faces and visible straps. The identical nature of 306 and 308 demonstrates the ease with which virtual assets can be duplicated. In a scenario where these assets are associated with different creators or unauthorized duplication occurs, the lack of a distinguishing feature complicates efforts to identify and attribute the assets to their rightful creator.

Figure 3B:
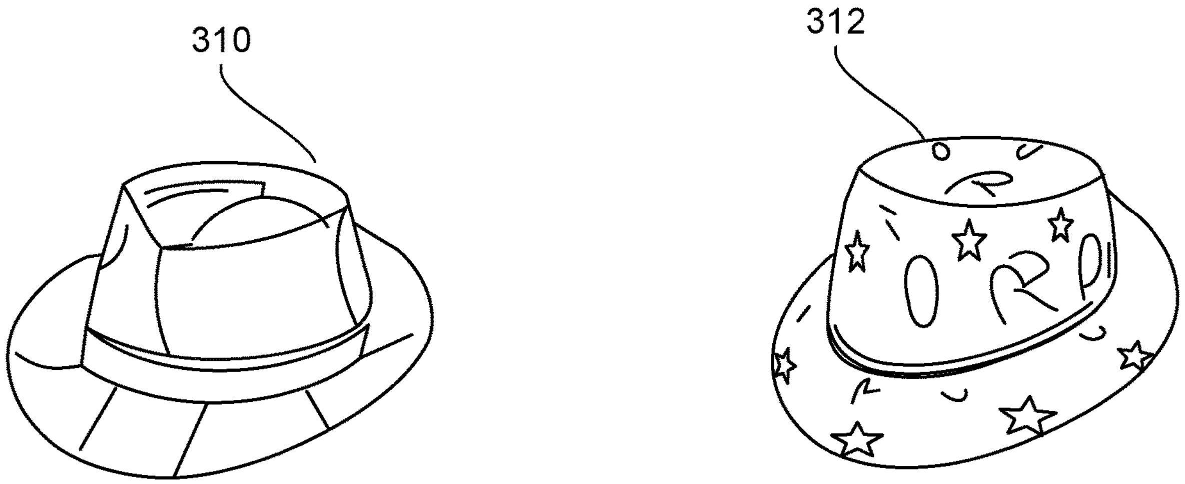
FIG. 3B is a diagram that illustrates an example of a pair of geometrically identical virtual assets within a virtual platform, in accordance with some implementations.

FIG. 3B is a diagram that illustrates an example of a pair of geometrically identical virtual assets with different textures where both are allowed on the platform, in accordance with some embodiments. The first virtual asset, labeled 310, represents a known, protected virtual asset within the virtual platform. This asset features a distinct polygonal geometry, comprising a hat with angular surfaces and a specific set of visual characteristics. The asset design is protected, meaning that it is subject to platform policies regarding content protection and cannot be replicated without proper authorization. The texture applied to virtual asset 310 is relatively simple, emphasizing its angular and faceted appearance, which contributes to the recognizable visual identity of the asset.

The second virtual asset, labeled 312, features identical geometry to the protected virtual asset 310, but with a different surface texture that alters its appearance. The new texture incorporates stylized symbols and patterns, creating a visually distinct version of the hat. Despite the geometric similarities between assets 310 and 312, the different texture design is considered sufficiently unique to meet the platform requirements for originality. Therefore, the new virtual asset 312 is allowed on the platform without violating content protection policies, as it differentiates itself visually from the protected asset 310 by applying unique textural features.

Figure 3C:
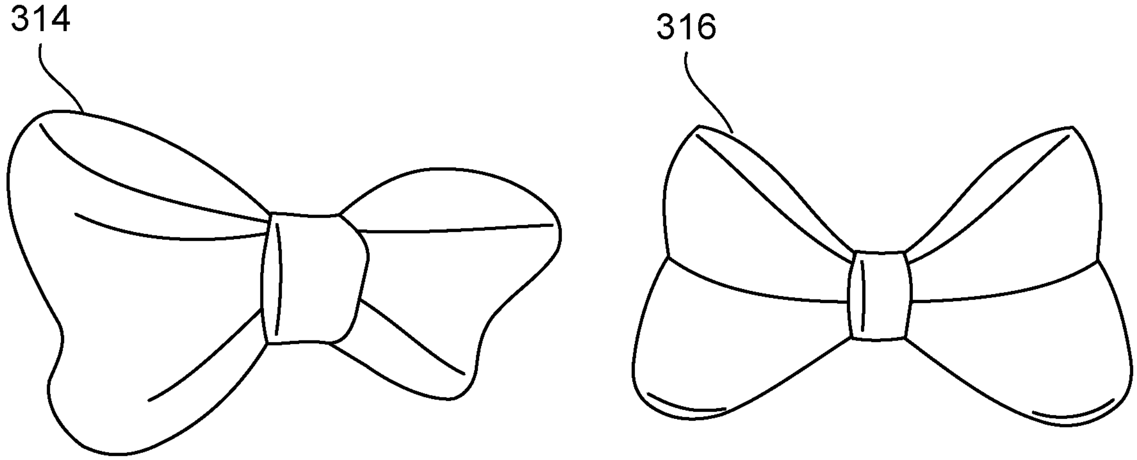
FIG. 3C is a diagram that illustrates an example of a pair of near-identical virtual assets, in accordance with some implementations.

FIG. 3C is a diagram that illustrates an example of a pair of near-identical virtual assets, in accordance with some implementations. These assets, labeled as 314 and 316, represent two bow-shaped designs that are similar in structure and appearance but feature subtle differences in their geometry and color. Virtual assets of this type are often used as decorative accessories for avatars or objects within a virtual environment, offering customization options for users. The similarities between the two items demonstrate the challenges of distinguishing between slightly altered versions of virtual assets.

The first virtual asset, labeled 314, is a bow with a slightly wider shape and deeper color saturation. Its structure includes rounded edges and a central knot, giving it a three-dimensional appearance. The second asset, labeled 316, shares the same overall design as 314 but is smaller in size, features a more compact structure, and has a lighter color tone. Despite these differences, the core design elements, such as the bow shape and placement of the central knot, are consistent across both assets.

The near-identical nature of virtual assets 314 and 316 poses challenges for distinguishing original creations from derivatives or unauthorized copies. In cases where these assets are associated with different creators or are uploaded to the platform independently, it may be difficult to identify whether one is a legitimate derivative or an unauthorized duplicate. Subtle changes, such as resizing or altering the color, can make it harder to detect similarities using conventional comparison techniques, particularly in large-scale virtual asset repositories.

Figure 3D:
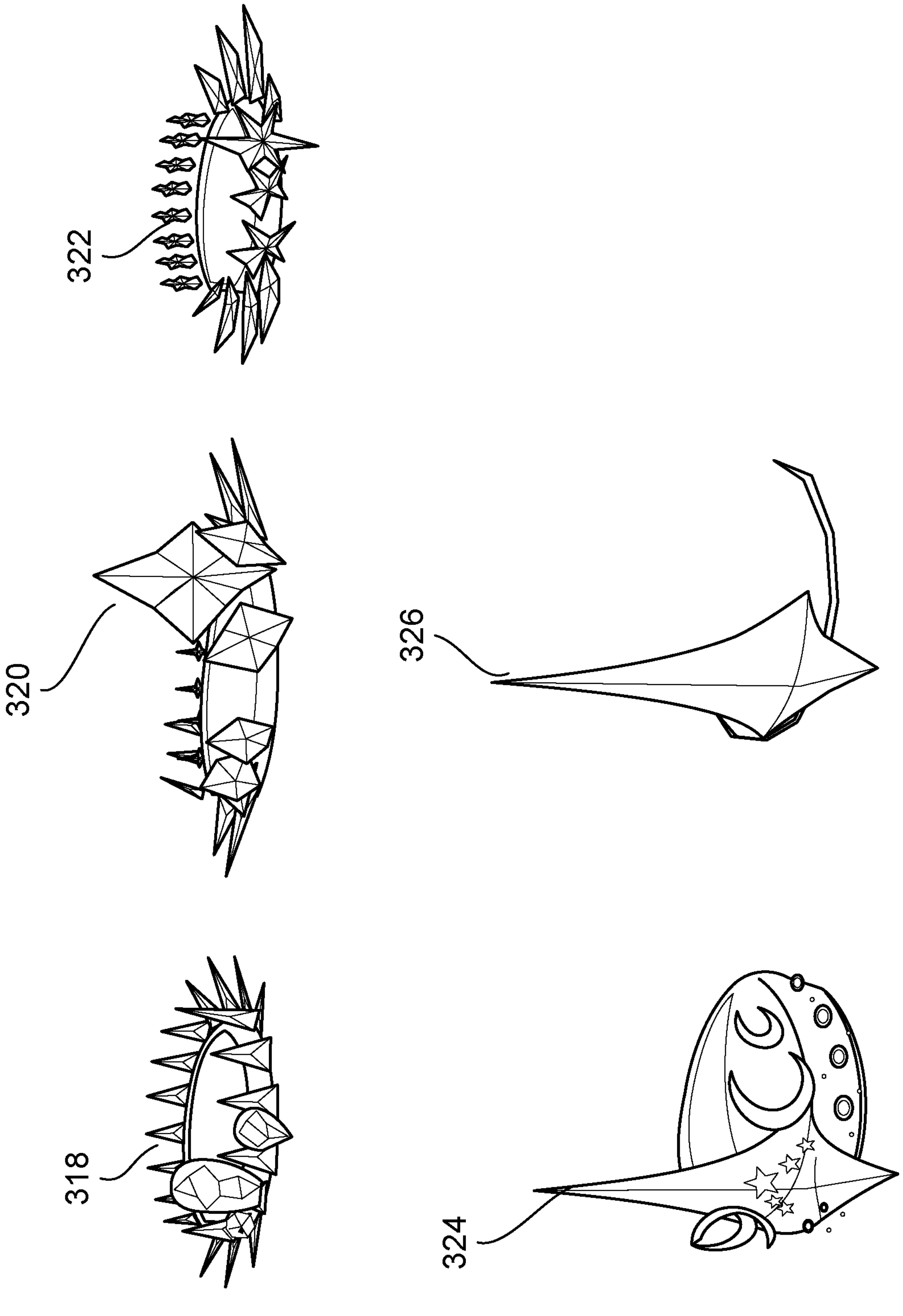
FIG. 3D is a diagram that illustrates examples of virtual assets that, while not identical, are considered copies in violation of content policy due to their similarity to specific instances of protected virtual assets, in accordance with some implementations.

FIG. 3D is a diagram that illustrates examples of virtual assets that, while not identical, are considered copies in violation of content policy due to their similarity to specific instances of protected virtual assets, in accordance with some implementations. The diagram depicts five virtual assets, labeled 318, 320, 322, 324, and 326. These assets demonstrate how slight variations in geometry or appearance may still result in designs being classified as unauthorized copies within a virtual platform.

The virtual asset labeled 318 is a spiked crown with jagged edges, a rugged design, and a dark metallic texture. The asset labeled 320 closely resembles 318, sharing the same spiked crown structure, but with slight geometric changes such as elongated spikes and additional detailing. Despite these minor differences, the overall design and structure of 320 remain visually and conceptually similar to 318. For this reason, 320 is considered a copy of 318 under content policy, since the core design elements have been preserved.

The virtual asset labeled 322 also draws from the spiked crown design of 318, but with additional refinements. The spikes are smoother and more polished, and the metallic finish is lighter in tone, giving the asset a less rugged appearance. The structural similarities to 318, including the overall shape and spiked motif, remain prominent. As a result, 322 is also considered a copy of 318.

The virtual asset labeled 324 features an ornate, curved design of a crown. The virtual asset labeled 326 closely mirrors 324 in style and design elements. Asset 326 is a sharp, angular creation, retaining stylistic cues from 324, such as the use of color and prominent decorative accents. Due to these similarities, 326 is considered a copy of 324 under content policy, as it borrows heavily from the stylistic elements of the original design.

The illustrated examples demonstrate the complexities of identifying and managing unauthorized copies within virtual platforms. While some designs, such as 320 and 322, may be classified as copies due to their geometric resemblance to 318, others, like 326, may derive their similarities from stylistic motifs and design cues found in 324.

Figure 4A:
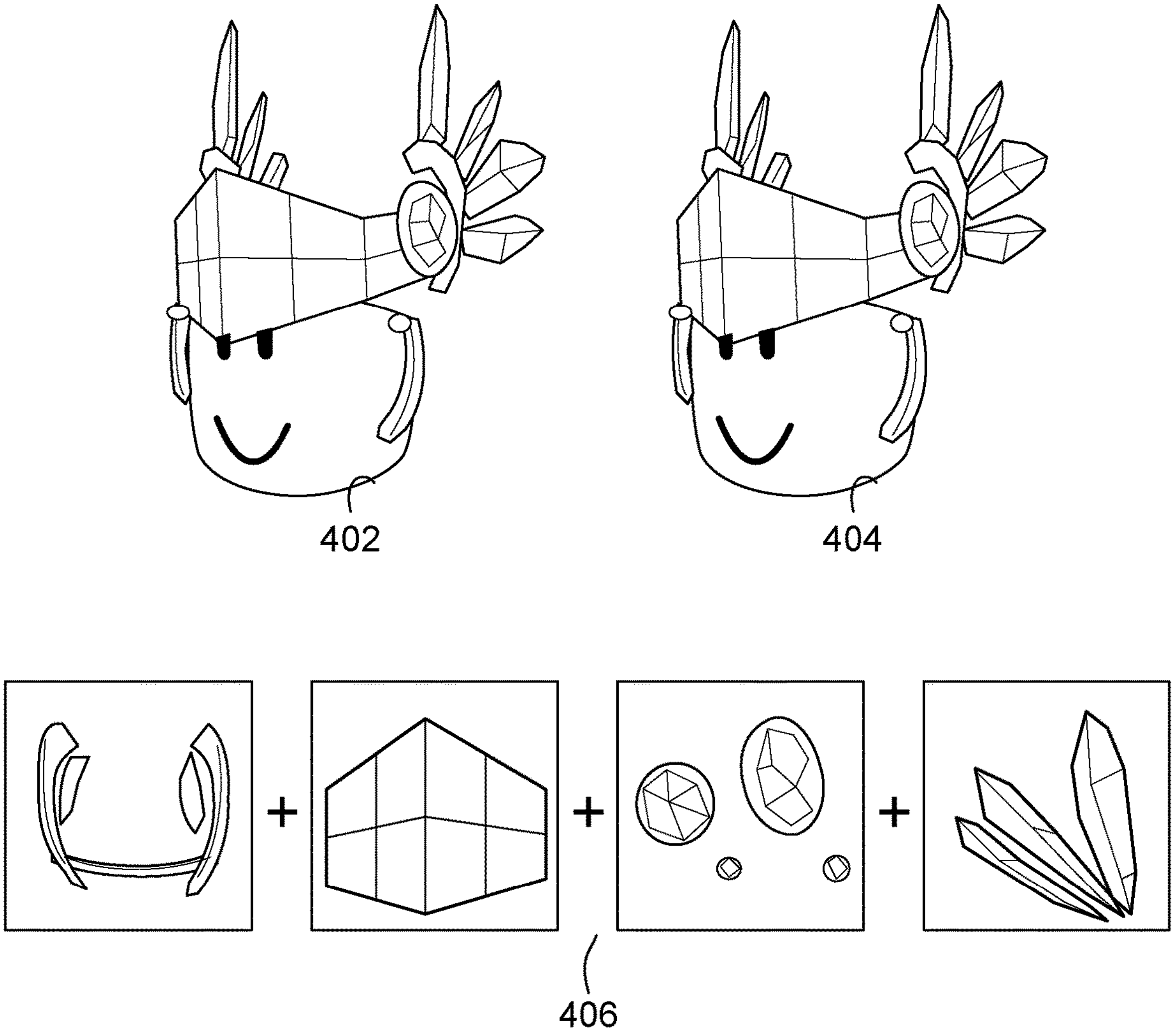
FIG. 4A is a diagram that illustrates an example of a virtual asset replication scenario, in accordance with some implementations.

FIG. 4A is a diagram that illustrates an example of a virtual asset replication scenario, in accordance with some implementations. The diagram shows two outfits: the first outfit 402 depicts user-generated content (UGC) that has been used to replicate a rare and limited-edition virtual asset. The second outfit 404 depicts the legitimate, original version of the rare asset within the virtual platform. The UGC creator has fragmented the original asset into multiple components and reassembled them to visually mimic the original, violating the policies of the platform regarding user-generated content.

In the first section, the user-generated outfit 402 is shown as a nearly identical copy of the original rare asset. The UGC creator has reconstructed the appearance of the rare virtual asset by combining several separately uploaded components, resulting in an outfit that is visually indistinguishable from the legitimate version. Although the two outfits appear the same, the user-generated outfit has been built using individual parts that have been designed to bypass detection mechanisms and policies that prohibit direct copying of high-value assets on the platform.

The second section 406 shows the four distinct components that were uploaded as individual user-generated assets, which together replicate the original rare item. The first component, named "Base," mirrors the base of the original asset. The second component, "Tiara," mirrors the main front-facing structure of the headgear. The third component, "Rubies," mirrors the ornamental gems present on the headgear. The fourth component, "Diamonds," mirrors the spiked elements of the original item, completing the one-to-one identical visual similarity to the legitimate asset.

By uploading the components separately, the UGC creator is able to avoid triggering automatic detection techniques that are designed to prevent copying of rare or valuable assets. Each component is treated as an independent user-generated item, enabling the pieces to be sold and equipped without violating platform restrictions on copying complete rare items. When combined, the separate components create a near-identical copy of the original, rare virtual asset, which is shown in outfit 404. The technique enables the UGC creator to bypass content policies while enabling users to obtain and display an unauthorized version of the limited-edition asset.

Figure 4B:
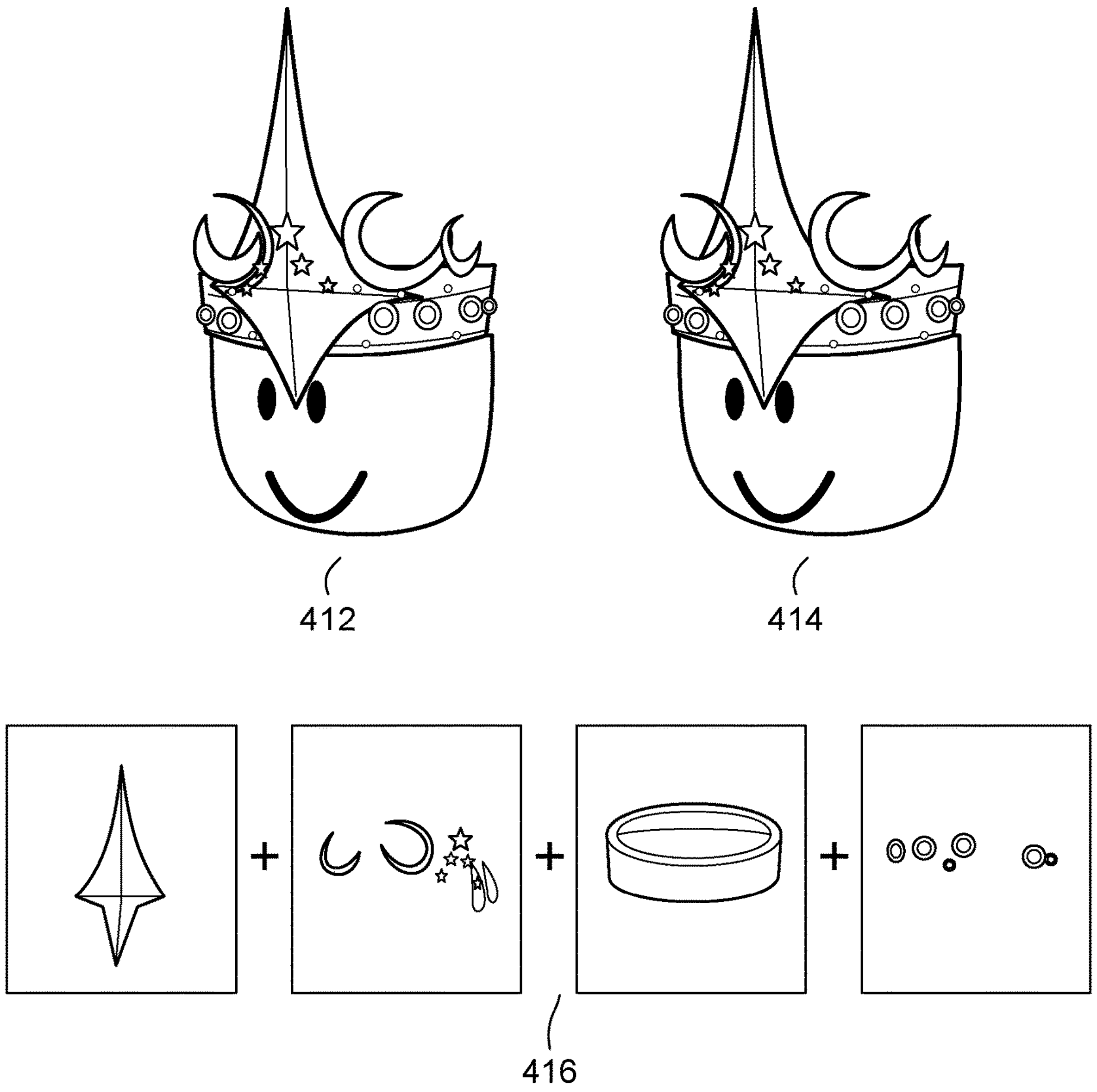
FIG. 4B is a diagram that illustrates an example of a copy of virtual assets, in accordance with some implementations.

FIG. 4B is a diagram that illustrates an example of a copy of virtual assets, in accordance with some implementations. Much like FIG. 4A, FIG. 4B depicts a one-to-one identical copy of a rare, limited edition virtual asset that has been fragmented into separate virtual assets, in violation of user-generated content policies of the virtual platform. The diagram shows two depictions of virtual outfits, the first outfit 412 representing user-generated content (UGC), and the second outfit 414 representing the original, limited-edition rare virtual asset within a virtual platform. The UGC creator has fragmented the original asset, a crown, and uploaded it as four distinct components, violating the content policies of the platform. The original asset has a high price to acquire, making it a highly coveted item in the virtual platform.

In the first section of FIG. 4B, the user-generated outfit 412 replicates the original rare asset 414 in its entirety. The UGC creator has deconstructed the crown into separate parts and uploaded the components individually, enabling users to reassemble them to create a one-to-one visual copy of the rare item. Despite being separated into multiple components, the user-generated outfit 412 is visually indistinguishable from the original rare asset 414 when fully assembled.

The second section 416 of FIG. 4B shows the four individual components that the UGC creator has uploaded to recreate the rare asset. The first component mirrors the main spiked element of the crown, a distinctive feature of the crown. The second component mirrors the ornamental loops and jewels that wrap around the crown. The third component mirrors the base of the crown. The fourth component represents the gemstones that adorn the crown, completing the visual match to the original rare asset.

Figure 5:
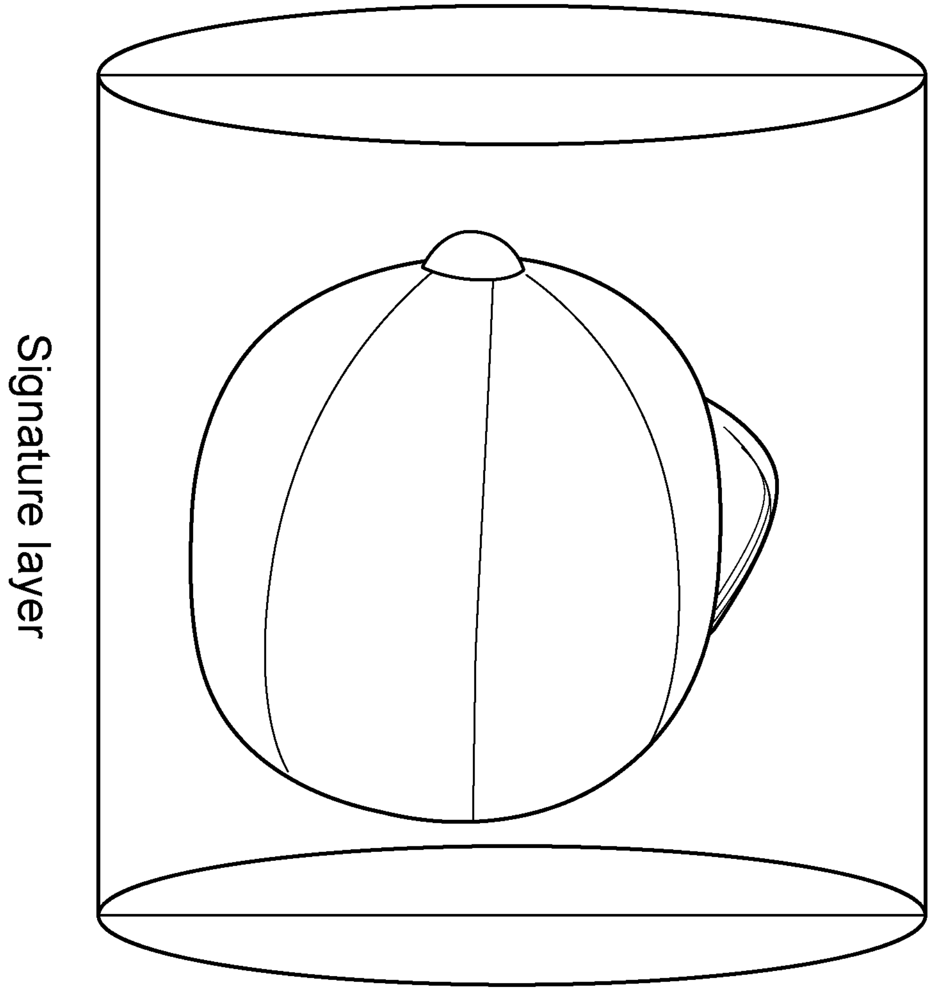
FIG. 5 is a diagram that illustrates an example of using cylindrical billboarding to apply a two-dimensional signature to a virtual asset, in accordance with some implementations

FIG. 5 is a diagram that illustrates an example of using cylindrical billboarding to apply a 2D signature to a virtual asset, in accordance with some implementations. The virtual asset shown is a hat. The cylindrical billboarding technique enables the 2D signature layer to remain visible to viewers from various perspectives by dynamically orienting it around the surface of the asset. The cylindrical shape of the signature layer, as depicted in the figure, is determined by a radius equal to the maximum radius of the virtual asset in the horizontal plane.

In this implementation, the 2D signature is positioned on an invisible cylindrical layer that surrounds the virtual asset. The radius of the cylinder matches the maximum horizontal distance from the center of the virtual asset to its outer edge. This alignment enables the signature to be applied uniformly and remain proportional to the size and shape of the asset, regardless of its geometry.

The cylindrical billboarding effect operates by adjusting the orientation of the 2D signature relative to the viewpoint of the user. As the perspective of the viewer changes within the virtual environment, the cylindrical layer is dynamically rotated to maintain the visibility of the signature. This is achieved by aligning the normal vector of the signature with the line of sight from the viewer to the asset, enabling the signature to appear oriented toward the viewer at all times. This dynamic adjustment prevents the signature from being obscured or distorted as the asset is rotated or viewed from different angles.

Figure 6A:
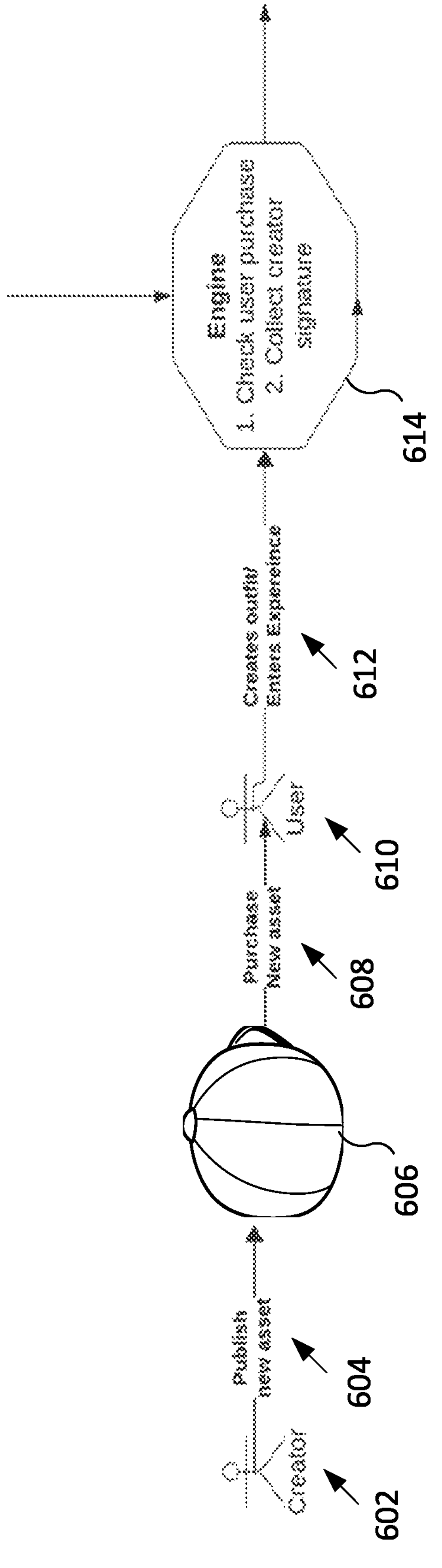
FIG. 6A is a diagram that illustrates a workflow to provide creator signatures on virtual assets within a virtual platform, in accordance with some implementations.

FIG. 6A is a diagram that illustrates a flow to provide creator signatures on virtual assets within a virtual platform, in accordance with some implementations. The labeled components in the diagram represent the steps and entities involved in the process. At block 604, a creator (602) publishes a new virtual asset to a virtual platform. This virtual asset, depicted as a hat (606), is made available for users to purchase or otherwise acquire through the virtual platform.

At block 608, a user (610) purchases the new virtual asset. The acquisition establishes the ownership or access rights of the user within the virtual platform. At block 612, after purchasing the asset, the user incorporates it into an outfit or associates it with their avatar. The user enters a virtual experience, such as a gaming environment, where the virtual asset becomes part of the visual representation of their avatar.

At block 614, an engine of the virtual platform performs two primary operations to apply the creator signature. First, the engine checks details associated with the purchase of the user to verify that the user has legitimate access to the virtual asset. In various implementations, the verification includes one or both of querying a database of the virtual platform to confirm the ownership record, or validating metadata associated with the asset. Second, the engine retrieves the creator signature associated with the creator of the asset. Once the creator signature is retrieved, it is dynamically applied to the virtual asset during a rendering process.

Figure 6B:
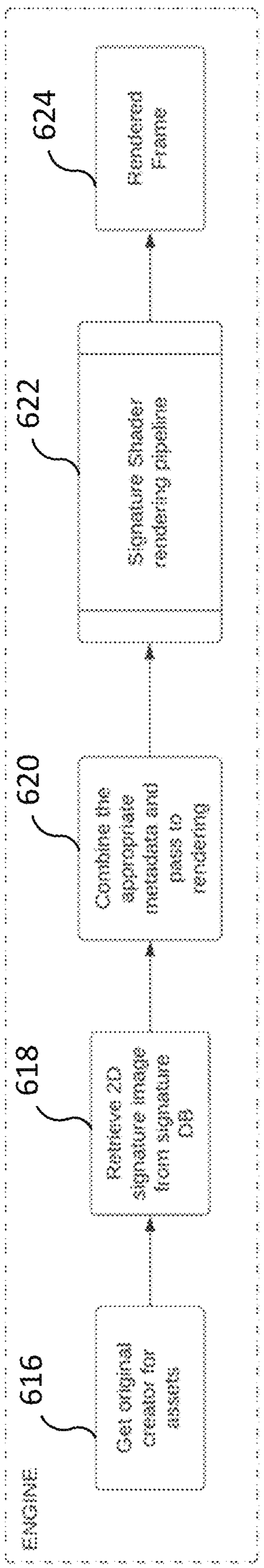
FIG. 6B is a diagram that illustrates a rendering flow to provide creator signatures on virtual assets within a virtual platform, in accordance with some implementations.

FIG. 6B is a diagram that illustrates a rendering flow to provide creator signatures on virtual assets within a virtual platform, in accordance with some implementations. The diagram depicts operations performed by an engine of the virtual platform and a rendering pipeline to retrieve and integrate a creator signature into the rendering for a virtual asset. The rendering is performed at block 616 and culminates in the generation of a rendered frame at block 624.

At block 616, the engine identifies and retrieves the original creator for the virtual asset. The identification and retrieval includes querying a database of the platform to determine the creator associated with the asset. At block 618, the 2D signature image associated with the creator is retrieved from the signature database. The signature database includes validated and unique creator signatures stored as 2D images, which define the visual properties of the signature. These images are extracted and prepared for application during the rendering process.

At block 620, the retrieved signature image is combined with the relevant metadata for the virtual asset and passed to the rendering pipeline. This metadata may include, for example, positional information, dynamic behavior parameters, or other attributes required for the rendering process. In some implementations, the signature and metadata are prepared in a compatible format.

At block 622, the prepared data enters the signature shader rendering pipeline, where the fragment shader applies the creator signature to the virtual asset dynamically. The shader overlays the signature as a visual layer, modulating its properties such as, e.g., transparency, brightness, or position based on the predefined parameters or real-time environmental conditions. The output is a rendered frame, labeled as block 624, where the virtual asset is displayed with the dynamically applied creator signature as part of the virtual experience.

Figure 7:
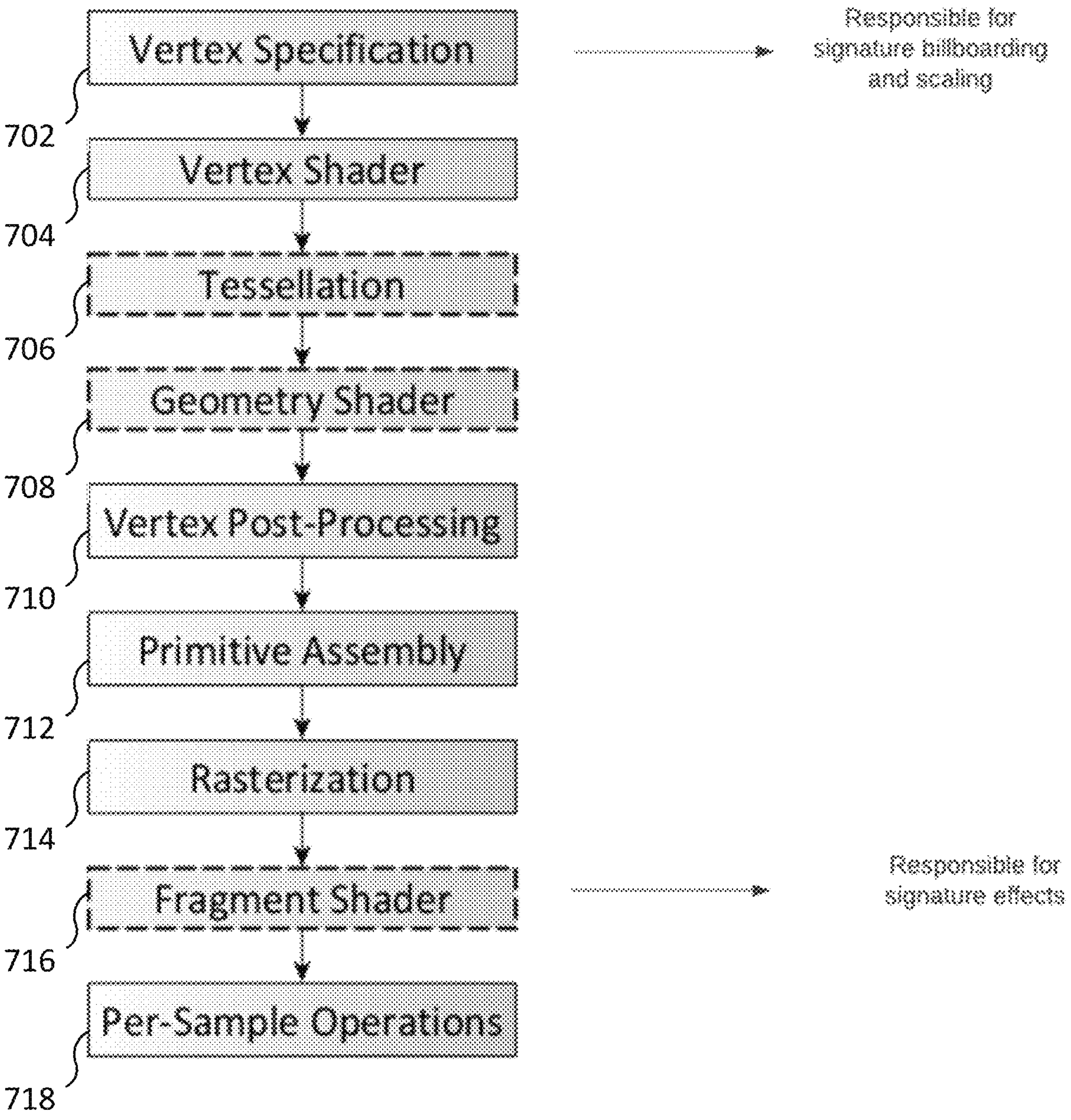
FIG. 7 is a diagram that illustrates example components of a rendering pipeline used to process virtual assets and dynamically apply creator signatures, in accordance with some implementations.

FIG. 7 is a diagram that illustrates example components of a rendering pipeline used to process virtual assets and dynamically apply creator signatures, in accordance with some implementations. The rendering pipeline is responsible for transforming input data into a rendered image, with stages contributing to the application and modulation of the creator signature. The diagram includes labeled components from vertex specification to per-sample operations, illustrating aspects such as, e.g., billboarding, scaling, and signature effects integration.

At block 702, vertex specification is performed. The geometric properties of the virtual asset are defined, including the vertices and edges that constitute the structure of the asset. This information is used to represent the asset as a set of points in three-dimensional space, which serve as the building blocks for the rendering process. Parameters for integrating the creator signature, such as positioning and scaling, are introduced.

Block 704 includes a vertex shader, which processes each vertex to apply transformations, such as scaling, rotation, or translation. The vertex shader is responsible for orienting the creator signature by using cylindrical billboarding techniques. Billboarding enables the signature to remain visible to the viewer from any perspective by dynamically aligning it with the viewing direction. Scaling operations are also carried out at this stage to adjust the size of the signature relative to the virtual asset based on its current context within the virtual environment.

Block 706 introduces an optional tessellation stage. Tessellation includes subdividing the geometric primitives of the virtual asset into smaller sections, which enhances the level of detail when rendering the asset. Tessellation provides an increased geometric density that enables the signature to be smoothly integrated onto complex surfaces.

In block 708, a geometry shader processes geometric primitives, such as triangles. This stage can create new geometry or modify existing geometry dynamically. For virtual assets that require intricate placement of the creator signature, the geometry shader can be used to adjust the signature shape or generate additional primitives that enhance the appearance of the asset.

Block 710 includes vertex post-processing, where additional modifications are applied to the vertex data before it is passed along to subsequent stages. The vertex data is refined to ensure that transformations, such as scaling or rotation, are consistent across all vertices of the asset.

At block 712, primitive assembly takes place, combining individual vertices into geometric primitives such as triangles, lines, or points. The creator signature is assembled along with the virtual asset geometry to create a cohesive visual representation.

At block 714, rasterization is performed. Rasterization includes converting the assembled primitives into a pixel-based representation, preparing the data for fragment processing. Rasterization includes determining which pixels on the screen are covered by the primitives of the virtual asset, including those associated with the creator signature.

At block 716, a fragment shader processes each fragment, which corresponds to a pixel generated during rasterization. The fragment shader applies dynamic effects to the creator signature, including transparency, color modulation, and animations. The fragment shader utilizes environmental parameters, such as lighting conditions or viewer proximity, to calculate adjustments that enable the signature to blend with the rest of the asset. For example, the signature may pulsate in brightness or change its color based on the time of day in the virtual environment.

At block 718, per-sample operations are performed on each individual sample output from the fragment shader. These operations can include, for example, anti-aliasing, depth testing, and blending, such that the rendered frame appears smooth and visually accurate. Depth testing is used to determine the correct positioning of the signature in relation to other objects in the scene, while blending ensures that the signature does not obscure or distort underlying features of the virtual asset. The completed frame, including the rendered virtual asset and its dynamically integrated creator signature, is output for display in the virtual environment.

Computing Device

Figure 8:
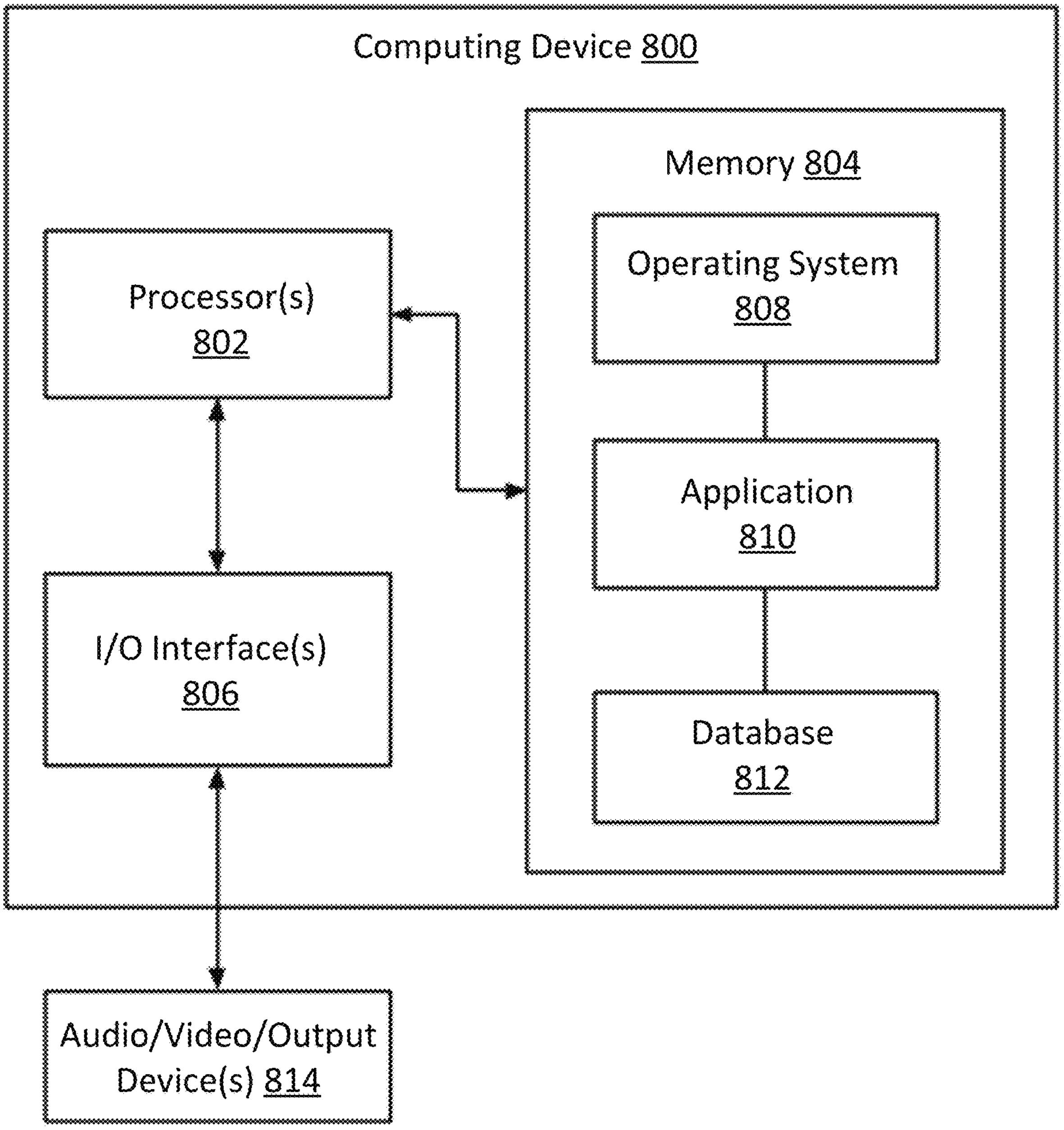
FIG. 8 is a block diagram that illustrates an example computing device, in accordance with some implementations.

FIG. 8 is a block diagram of an example computing device 800 which may be used to implement one or more techniques described herein, including one or more techniques described with reference to FIG. 2, FIG. 3, and FIG. 4. In one example, device 800 may be used to implement a computer device (e.g., 102 and/or 110 of FIG. 1), and perform appropriate method implementations described herein. Computing device 800 can be any suitable computer system, server, or other electronic or hardware device. For example, the computing device 800 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 800 includes a processor 802, a memory 804, input/output (I/O) interface 806, and audio/video input/output devices 814.

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "near-real-time", "offline," in a "batch mode," etc. Portions of processing may be performed at different times and at different locations, by different (or the same) processing systems. A computer may be any processor in communication with a memory.

Memory 804 is provided in device 800 for access by the processor 802, and may be any suitable computer-readable or processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the server device 800 by the processor 802, including an operating system 808, one or more applications 810, and a database 812 that may store data used by the components of device 800.

Database 812 may store datasets of virtual assets and associated creator signatures used for attribution and moderation within a virtual platform. This includes datasets of base assets, augmented assets, and user-generated outfits annotated with creator signatures and metadata such as accessory type, color, style, and other visual attributes pertinent to platform policies. The database may also include validation records to verify the uniqueness of each creator signature and associated visual properties. Additionally, the database may store parameters for the signature shader rendering pipeline, enabling dynamic application of creator signatures to virtual assets during rendering. Applications 810 may include instructions for processor 802 to execute functions such as verifying asset ownership, validating creator signatures, and applying fragment shaders to integrate creator signatures as dynamic visual elements.

For example, applications 810 can include a module that implements one or more processes used in the application of creator signatures to virtual assets within a virtual platform, such as a signature shader rendering pipeline and validation mechanisms. Applications 810 may include mechanisms for generating and storing metadata related to creator signatures and the associated virtual assets, enabling dynamic integration of the signature during the rendering process. The applications can include a verification model to verify that each creator signature is unique, validating it against other signatures within the database to prevent duplicates. The applications may also utilize dynamic modulation parameters to adjust the visual properties of the creator signature. Database 812 (and/or other connected storage) can store data used in these processes, including validated creator signatures, associated virtual assets, signature metadata, shader parameters, and modulation settings for the dynamic visual elements applied during rendering.

Elements of software in memory 804 can alternatively be stored on any other suitable storage location or computer-readable medium. In addition, memory 804 (and/or other connected storage device(s)) can store instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. For example, network communication devices, storage devices (e.g., memory and/or data store 120), and input/output devices can communicate via interface 806. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 814 can a variety of devices including a user input device (e.g., a mouse, etc.) that can be used to receive user input, audio output devices (e.g., speakers), and a display device (e.g., screen, monitor, etc.) and/or a combined input and display device, which can be used to provide graphical and/or visual output.

For ease of illustration, FIG. 8 shows one block for each of processor 802, memory 804, I/O interface 806, and software blocks of operating system 808 and virtual experience application 810. The blocks may represent one or more processors or processing circuitries, operating systems, memories, I/O interfaces, applications, and/or software engines. In other implementations, device 800 may not have all of the components shown and/or may have other elements including other types of elements instead of, or in addition to, those shown herein. While the online virtual experience server 102 is described as performing operations as described in some implementations herein, any suitable component or combination of components of online virtual experience server 102, client device 110, or similar system, or any suitable processor or processors associated with such a system, may perform the operations described.

Device 800 can be a server device or client device. Example client devices or user devices can be computer devices including some similar components as the device 800, e.g., processor(s) 802, memory 804, and I/O interface 806. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 814, for example, can be connected to (or included in) the device 800 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 200 and other described techniques) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, the particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, blocks, operations, or computations may be presented in a specific order, the order may be changed in different particular implementations. In some implementations, multiple steps or operations shown as sequential in this specification may be performed at the same time.

The invention claimed is:

1. A computer-implemented method comprising:
receiving a request to display a virtual asset associated with a creator within a virtual platform, wherein the request is associated with an avatar in a virtual environment hosted on the virtual platform;
retrieving a creator signature associated with the creator, wherein the creator signature defines a set of visual properties unique to the creator and wherein the creator signature is stored separately from the virtual asset;
rendering the virtual asset for display in the virtual environment by:
rasterizing the virtual asset to generate a pixel-based representation, and
applying a fragment shader to overlay the creator signature onto the pixel-based representation of the virtual asset, wherein the creator signature is applied as a dynamic visual element that alters over time based on one or more predefined parameters; and
displaying the rendered virtual asset with the dynamic visual element in the virtual environment.

2. The computer-implemented method of claim 1, wherein the predefined parameters for the dynamic visual element comprise one or more time-based effects selected from the group comprising: color pulsing, rotation, and brightness variation.

3. The computer-implemented method of claim 1, wherein displaying the rendered virtual asset comprises:
positioning the dynamic visual element such that the dynamic visual element is visible to one or more avatars in the virtual environment, wherein different avatars of the one or more avatars are at respective locations within the virtual environment.

4. The computer-implemented method of claim 1, wherein applying the fragment shader comprises implementing a cylindrical billboarding effect to orient the dynamic visual element towards a viewer in the virtual environment.

5. The computer-implemented method of claim 1, further comprising:
applying a transparency effect to the dynamic visual element, such that the dynamic visual element does not obstruct underlying visual characteristics of the virtual asset.

6. The computer-implemented method of claim 1, wherein one or more properties of the dynamic visual element are modulated based on data from the virtual environment.

7. The computer-implemented method of claim 6, wherein the data from the virtual environment comprises one or more pieces of data selected from the group comprising: real-time lighting conditions data, a distance between a viewer and the dynamic visual element, and a time of day within the virtual environment.

8. The computer-implemented method of claim 1, wherein the virtual asset is an avatar accessory for the avatar and further comprising:
prior to rendering the virtual asset, verifying that a user associated with the avatar has obtained authorized access to the virtual asset within the virtual platform.

9. The computer-implemented method of claim 1, further comprising:
validating that the creator signature is distinct from one or more other existing creator signatures; and
storing the creator signature in association with a creator account.

10. The computer-implemented method of claim 9, wherein:
the creator signature is a two-dimensional (2D) image;
validating that the creator signature is distinct from the one or more other existing creator signatures comprises performing a comparison against respective other 2D images associated with other creators to verify that the creator signature is unique; and
the 2D image is applied as the dynamic visual element.

11. A computing device comprising:
one or more processors; and
memory coupled to the one or more processors storing instructions that, when executed by the one or more processors, cause the one or more processors to perform operations comprising:
receiving a request to display a virtual asset associated with a creator within a virtual platform, wherein the request is associated with an avatar in a virtual environment hosted on the virtual platform;
retrieving a creator signature associated with the creator, wherein the creator signature defines a set of visual properties unique to the creator and wherein the creator signature is stored separately from the virtual asset;
rendering the virtual asset for display in the virtual environment by:
rasterizing the virtual asset to generate a pixel-based representation, and
applying a fragment shader to overlay the creator signature onto the pixel-based representation of the virtual asset, wherein the creator signature is applied as a dynamic visual element that alters over time based on one or more predefined parameters; and
displaying the rendered virtual asset with the dynamic visual element in the virtual environment.

12. The computing device of claim 11, wherein the predefined parameters for the dynamic visual element comprise one or more time-based effects selected from the group comprising: color pulsing, rotation, and brightness variation.

13. The computing device of claim 11, wherein displaying the rendered virtual asset comprises:
positioning the dynamic visual element such that the dynamic visual element is visible to one or more avatars in the virtual environment, wherein different avatars of the one or more avatars are at respective locations within the virtual environment.

14. The computing device of claim 11, wherein applying the fragment shader comprises implementing a cylindrical billboarding effect to orient the dynamic visual element towards a viewer in the virtual environment.

15. The computing device of claim 11, wherein the instructions cause the one or more processors to perform a further operation comprising:

applying a transparency effect to the dynamic visual element, such that the dynamic visual element does not obstruct underlying visual characteristics of the virtual asset.

16. The computing device of claim 11, wherein one or more properties of the dynamic visual element are modulated based on data from the virtual environment.

17. The computing device of claim 16, wherein the data from the virtual environment comprises one or more pieces of data selected from the group comprising: real-time lighting conditions data, a distance between a viewer and the dynamic visual element, and a time of day within the virtual environment.

18. The computing device of claim 11, wherein the virtual asset is an avatar accessory for the avatar and wherein the operations further comprise:

prior to rendering the virtual asset, verifying that a user associated with the avatar has obtained authorized access to the virtual asset within the virtual platform.

19. The computing device of claim 11, wherein the instructions cause the one or more processors to perform further operations comprising:

validating that the creator signature is distinct from one or more other existing creator signatures; and storing the creator signature in association with a creator account.

20. A non-transitory computer-readable medium with instructions stored thereon that, when executed by a processor, cause the processor to perform operations comprising:

receiving a request to display a virtual asset associated with a creator within a virtual platform, wherein the request is associated with an avatar in a virtual environment hosted on the virtual platform;

retrieving a creator signature associated with the creator, wherein the creator signature defines a set of visual properties unique to the creator and wherein the creator signature is stored separately from the virtual asset;

rendering the virtual asset for display in the virtual environment by:

rasterizing the virtual asset to generate a pixel-based representation, and applying a fragment shader to overlay the creator signature onto the pixel-based representation of the virtual asset, wherein the creator signature is applied as a dynamic visual element that alters over time based on one or more predefined parameters; and displaying the rendered virtual asset with the dynamic visual element in the virtual environment.

* * * * *